US010366435B2

United States Patent
Swinson

(10) Patent No.: US 10,366,435 B2
(45) Date of Patent: Jul. 30, 2019

(54) VEHICLE DATA SYSTEM FOR RULES BASED DETERMINATION AND REAL-TIME DISTRIBUTION OF ENHANCED VEHICLE DATA IN AN ONLINE NETWORKED ENVIRONMENT

(71) Applicant: TRUECAR, INC., Santa Monica, CA (US)

(72) Inventor: Michael D. Swinson, Santa Monica, CA (US)

(73) Assignee: TrueCar, Inc., Santa Monica, CA (US)

(*) Notice: Subject to any disclaimer, the term of this patent is extended or adjusted under 35 U.S.C. 154(b) by 294 days.

(21) Appl. No.: 15/471,805

(22) Filed: Mar. 28, 2017

(65) Prior Publication Data

US 2017/0287043 A1   Oct. 5, 2017

Related U.S. Application Data

(60) Provisional application No. 62/314,731, filed on Mar. 29, 2016.

(51) Int. Cl.
| | | |
|---|---|---|
| *G06Q 30/00* | (2012.01) | |
| *G06F 17/30* | (2006.01) | |
| *G06Q 30/06* | (2012.01) | |
| *G06F 16/951* | (2019.01) | |
| *G06F 16/957* | (2019.01) | |
| *G06F 16/904* | (2019.01) | |

(52) U.S. Cl.
CPC ....... *G06Q 30/0627* (2013.01); *G06F 16/904* (2019.01); *G06F 16/951* (2019.01); *G06F 16/9577* (2019.01)

(58) Field of Classification Search
CPC .................................................. G06Q 30/0627
See application file for complete search history.

(56) References Cited

U.S. PATENT DOCUMENTS

| | | |
|---|---|---|
| 7,050,982 B2 | 5/2006 | Sheinson |
| 7,219,080 B1 | 5/2007 | Wagoner et al. |
| 7,624,065 B2 | 11/2009 | Schoen et al. |
| 7,835,982 B2 | 11/2010 | Schoen et al. |
| 7,921,052 B2 | 4/2011 | Dabney et al. |
| 8,112,325 B2 | 2/2012 | Foy et al. |
| 8,126,881 B1 | 2/2012 | Sethi et al. |
| 8,230,362 B2 | 7/2012 | Couch |
| 8,326,845 B2 | 12/2012 | Sethi et al. |
| 8,375,037 B2 | 2/2013 | Sethi et al. |
| 8,521,619 B2 | 8/2013 | Perry, III et al. |
| 8,538,828 B2 | 9/2013 | Skutta |

(Continued)

OTHER PUBLICATIONS cars.com Uhttp://www.cars.com/ Internet Archive (Jul. 18, 2007)—http://web.archive.org/20070718071752/www.cars.com/.*

(Continued)

*Primary Examiner* — Kathleen Palavecino
(74) *Attorney, Agent, or Firm* — Sprinkle IP Law Group

(57) ABSTRACT

Vehicle data systems for the rule based collection of vehicle data from across a distributed heterogeneous computer network; rule based filtering and enhancing of that data; determination of rule sets pertaining to determination of pricing likelihood; and the real time presentation of accurate pricing likelihoods for specified vehicle configurations over a computer network using those rule sets are disclosed.

19 Claims, 8 Drawing Sheets

(56) References Cited

U.S. PATENT DOCUMENTS

| | | |
|---|---|---|
| 8,595,082 B2 | 11/2013 | Skutta |
| 8,868,572 B2 | 10/2014 | Sethi et al. |
| 9,103,743 B2 | 8/2015 | Couch |
| 9,104,718 B1 | 8/2015 | Levy et al. |
| 9,129,325 B2 | 9/2015 | Taira et al. |
| 9,189,960 B2 | 11/2015 | Couch et al. |
| 9,324,104 B1 | 4/2016 | Levy et al. |
| 9,347,758 B2 | 5/2016 | Berent et al. |
| D765,089 S | 8/2016 | Agee |
| 9,412,203 B1 | 8/2016 | Garcia, III et al. |
| 9,465,873 B1 | 10/2016 | Franke et al. |
| 9,466,079 B2 | 10/2016 | Hygema et al. |
| D774,523 S | 12/2016 | Agee |
| D774,524 S | 12/2016 | Agee |
| 9,600,822 B2 | 3/2017 | Pyle et al. |
| 2006/0129423 A1 | 6/2006 | Sheinson et al. |
| 2010/0161408 A1 | 6/2010 | Karson et al. |
| 2010/0274571 A1 | 10/2010 | McFall et al. |
| 2010/0274631 A1 | 10/2010 | McFall et al. |
| 2010/0292890 A1 | 11/2010 | Morris |
| 2011/0131652 A1 | 6/2011 | Robinson et al. |
| 2012/0005070 A1 | 1/2012 | McFall et al. |
| 2012/0284087 A1 | 11/2012 | Pollak |
| 2012/0284113 A1 | 11/2012 | Pollak |
| 2013/0191247 A1 | 7/2013 | Huang et al. |
| 2013/0339173 A1 | 12/2013 | Skutta |
| 2014/0032352 A1 | 1/2014 | Fraser et al. |
| 2014/0032353 A1 | 1/2014 | Fraser et al. |
| 2014/0067615 A1 | 3/2014 | Park et al. |
| 2014/0089208 A1 | 3/2014 | Humble et al. |
| 2014/0258044 A1 | 9/2014 | Chrzan et al. |
| 2014/0278806 A1 | 9/2014 | Duguid et al. |
| 2014/0279171 A1 | 9/2014 | Burgiss et al. |
| 2014/0279275 A1 | 9/2014 | Burgiss et al. |
| 2014/0351074 A1 | 11/2014 | Enge et al. |
| 2015/0220876 A1 | 8/2015 | Sethi et al. |
| 2015/0356672 A1 | 12/2015 | Humble et al. |
| 2015/0375699 A1 | 12/2015 | Lamprecht et al. |
| 2016/0034590 A1 | 2/2016 | Endras et al. |
| 2016/0343058 A1 | 11/2016 | Levy et al. |
| 2016/0371323 A1 | 12/2016 | Garcia, III et al. |

OTHER PUBLICATIONS

International Preliminary Report on Patentability issued for PCT Application No. PCT/US2017/024543, dated Oct. 2, 2018, 7 pages.
International Search Report and Written Opinion issued for PCT Application No. PCT/US2017/024543, dated Jun. 16, 2017, 9 pages.

\* cited by examiner

VEHICLE DATA SYSTEM FOR RULES BASED DETERMINATION AND REAL-TIME DISTRIBUTION OF ENHANCED VEHICLE DATA IN AN ONLINE NETWORKED ENVIRONMENT

RELATED APPLICATIONS

This application claims the benefit of priority under 35 U.S.C. § 119 to U.S. Provisional Patent Application Ser. No. 62/314,731 by Michael D. Swinson, entitled "System and Method for Providing a Measurement of the Likelihood of Obtaining a Particular Price" filed on Mar. 29, 2016, which is fully incorporated herein by reference for all purposes.

COPYRIGHT NOTICE

A portion of the disclosure of this patent document contains material that is subject to copyright protection. The copyright owner has no objection to facsimile reproduction of the patent document or the patent disclosure as it appears in the Patent and Trademark Office patent file or records, but otherwise reserves all copyright rights thereto.

Technical Field

This disclosure relates generally to online data collection and processing in a distributed and heterogeneous computer network environment. More particularly, this disclosure generally relates to systems and methods for rules based collection, filtering, enhancement, processing and presentation of distributed data and automobile pricing. Even more specifically, embodiments disclosed herein relate to systems and methods for rules based collection, filtering, enhancement and processing of vehicle pricing data in a heterogeneous computer network environment to facilitate the real-time presentation of pricing probabilities or likelihoods for specific vehicle configurations, time periods, geographies or other parameters.

Background

Currently, there are a number of online vehicle data systems that attempt to distribute certain vehicle data, including vehicle pricing data to users over an online network (e.g., Internet, cellular network, etc.). The current state of these vehicle data systems is, however, inadequate for the current demands of their users. These inadequacies stem from a number of deficiencies that can be grouped at a high level into two interrelated categories: the ability to both 1) distribute vehicle data in real-time over such online networks (i.e., at a speed at which a user of those online networks would expect a response under typical conditions), and 2) ensure that the vehicle data so distributed is accurate enough to meet those users' demands.

So far, vehicle data systems have been forced (at least by ever-increasing user expectations regarding the speed of such online networks) to attend solely to the first concern. Namely, ensuring that any vehicle data provided can be provided at a speed that may meet the expectations of users of such systems. These systems have therefore provided inaccurate vehicle pricing data, and in some cases, at least because of the speed and accuracy issues, have neglected to provide certain vehicle pricing data altogether.

As but one example, a vehicle price at which vehicle transactions (e.g., sales and purchases of automobiles) are concluded varies in response to a variety of factors, such as make, model, geography, date, or other parameters. Both dealers and purchasers would like to know the likelihood (or probability) of selling or purchasing a vehicle at a particular price given a number of these parameters. For example, dealerships, particularly new car dealerships, lack the ability to determine prices for which they are likely to sell a particular automobile. Historically, for a dealership to analyze their sales, they must invest considerable time, resources, and effort to cross-reference data between multiple systems, providers, and sources, often costing more than a typical automotive dealership can afford or is willing to spend. As the resulting analysis is confined to only their limited data, the resulting analysis may not provide an accurate and complete picture or pricing likelihood, particularly in the context of their geographically local market. Moreover, such analysis cannot be completed in a time frame which would be useful; by the time any such analysis is completed the data would be obsolete and rendered moot. On the other hand, consumers may lack any ability whatsoever to determine prices for which they are likely to have a purchase offer accepted to buy a particular vehicle, at least because consumers may have little or no access to historical sales or other data regarding vehicle transactions.

While a large variety of vehicle data is currently distributed across heterogeneous computer networks such as the Internet, it has heretofore been virtually impossible to collect, filter, enhance and process that data to present, in real-time, accurate pricing likelihoods based on various parameters over a distributed computer network. What is desired, therefore, are systems and methods to can collect this vehicle data from across a distributed heterogeneous computer networks, filter and enhance that data, and present accurate pricing likelihoods for specified vehicle configurations in real-time over the computer network.

SUMMARY

To meet those desires among others, attention is now directed to systems for the rule based collection of vehicle data from across a distributed heterogeneous computer networks; rule based filtering and enhancing of that data; determination of rule set pertaining to determination of pricing likelihood; and the real-time presentation of accurate pricing likelihoods for specified vehicle configurations over a computer network. In particular, embodiments of a vehicle data system may obtain actual sales transaction data from a variety of data source distributed across a heterogeneous computer network. This historical transaction data may be filtered and enhanced based on a set of rules to aggregate the vehicle data into data sets. The data sets processed to determine desired pricing data, where this determined pricing data may be associated with a particular configuration in a particular geography (e.g. make, model, power train, options, locale, etc.) of a vehicle. Based on this pricing data and other data such as inventory, supply and demand data, a set of likelihood rules can be determined.

The vehicle data system may present an interface to a user at the user's computer device over the computer network where a user may provide relevant information such as attributes of a desired vehicle configuration, a geographic area, or other parameters through the interface. The vehicle data system can apply a set of likelihood rules based on the parameters (e.g., vehicle configuration, geography, etc.) provided by the user to generate, in real-time, a likelihood of a price being accepted (e.g., by a seller or purchaser). This likelihood may be generated by selecting a set of dealers based on the user's locale and applying the likelihood rules to historical transaction data or other data (e.g., supply or demand data) associated with selected set of dealers.

The user can then be presented, in real-time, with a display pertinent to the provided parameters and prices utilizing the determined likelihood. Additionally, in some embodiments other data may be included on the presented interface, include data associated with an aggregated data set for a vehicle configuration, or other associated or determined pricing data such as a mean price, dealer cost or factory invoice for a desired vehicle, pricing distributions, relative price ranges or other data. In one embodiment, this interface may be a website such that the user can go to the website to provide relevant information and the display corresponding to the provided information is presented to the user through the website in real-time. The data presented in real-time over the computer network can be accurate and account for variations in the configuration of vehicles and the geography in which the vehicle will be purchased as it is based on actual sales transaction or other vehicle data.

These capabilities, among others, may be accomplished by embodiments of vehicle data systems disclosed herein through the use of a bi-furcated architecture by which a certain tasks are accomplished in a back-end process, including the gathering and binning of data and the use of such data to determine parameters for models or adjustment components that may be used to accurately determine likelihood. In a front-end process, requests for such likelihoods for specified vehicles or locations may be received over a network. Enabled by the data, models or adjustment components determined in the back-end, an accurate likelihood may be determined and an interface with the likelihood returned to the user in real-time over the network.

In one embodiment, a vehicle data system may include a processor and code to execute on that processor to implement a back-end process and a front-end process. In the back-end process, the vehicle data system can obtain a set of historical transaction records from a first set of distributed sources. Each of these transaction records may be associated with a corresponding vehicle identification number (VIN) and a dealer. The historical transaction records can be enhanced with additional vehicle data collected from a second set of distributed sources by VIN and binned based on at least one vehicle attribute and geography. A set of likelihood rules can be generated in the back-end process based on multivariable regression analysis of a set of vehicle attributes in the enhanced historical transaction records, wherein the likelihood rules define cumulative price distribution as a function of one or more vehicle attributes in the set of vehicle attributes.

In the front-end process, the vehicle data system may provide a web page to a client computer, the web page having one or more input fields for a user to provide a user-specified vehicle configuration comprising a set of user-specified vehicle attributes. The vehicle data system can receive the set of user-specified vehicle attributes over a network via the web page and generate a responsive web page in response to the user submitting the user-specified vehicle attributes. Generating the responsive web page in the front-end process may comprise applying dealer selection rules to select a set of dealers and determining values for the one or more vehicle attributes from the set of enhanced historical transaction records associated with the selected set of dealers. The likelihood model can be applied to the values for the one or more vehicle attributes determined from the set of enhanced historical transaction records associated with the selected set of dealers to generate a cumulative distribution of prices associated with the set of enhanced historical transaction records associated with the selected set of dealers. A curve can then be fit to the cumulative distribution generated from the set of enhanced historical transaction records corresponding to the selected set of dealers and HTML to cause a browser at the client computer to display the curve with the relative prices ranges visually represented on the curve may be generated and sent to the client computer.

In one embodiment, a user locale is received over a network via the web page in association with the set of user-specified vehicle attributes and the selection of the set of dealers using the dealer selection rules is based on the user's locale. The selected set of dealers may be the set of dealers closest to the user's locale.

In a particular embodiment, selecting the set of dealers comprises scoring the dealers based on a set of dealer scoring rules.

In another embodiment, the set of vehicle attributes include vehicle supply, vehicle demand, and the number of days that the vehicle has been on a selected dealer's lot. The vehicle supply can be associated with a number of vehicles currently in an inventory of the selected set of dealers.

In some embodiments, a set of cleansing rules may be applied to the set of historical transaction data to replace vehicle data of one or more historical transaction records.

In other embodiments, one or more relative price ranges or an average price paid for the user-specified vehicle configuration may be generated.

In another embodiment, the HTML is generated to cause a browser at the client computer to display the curve with the average price or one or more relative price ranges paid visually represented relative to the curve.

These, and other, aspects of the disclosure will be better appreciated and understood when considered in conjunction with the following description and the accompanying drawings. It should be understood, however, that the following description, while indicating various representative embodiments of the disclosure and numerous specific details thereof, is given by way of illustration and not of limitation. Many substitutions, modifications, additions and/or rearrangements may be made within the scope of the disclosure without departing from the spirit thereof, and the disclosure contemplates and includes all such substitutions, modifications, additions and/or rearrangements.

BRIEF DESCRIPTION OF THE DRAWINGS

The drawings accompanying and forming part of this specification are included to representatively depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1:
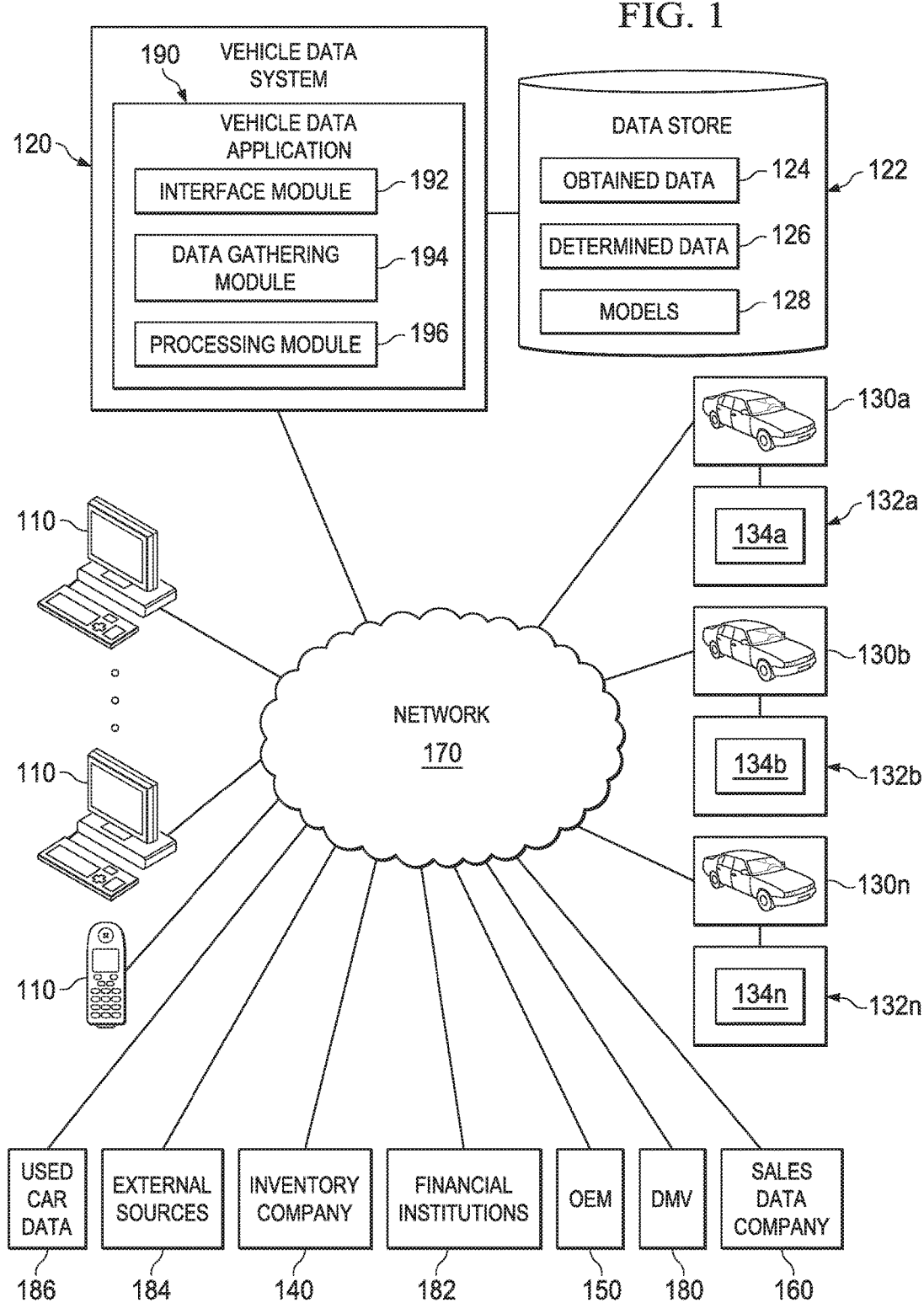
FIG. 1 generally depicts a diagrammatic illustration of one embodiment of a vehicle data system.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. For example, though embodiments of the present invention have been presented using the example commodity of vehicles it should be understood that other embodiments may be equally effectively applied to other commodities.

As discussed above, the purchase of vehicles or other commodities is fraught with complexity. In particular, the lack of knowledge regarding the probability of having a price accepted as a purchaser or seller introduces a significant unknown variable into these types of transactions. Currently, there are a number of online vehicle data systems that attempt to distribute certain vehicle data, including vehicle pricing data to users over an online network (e.g., Internet, cellular network, etc.). While none of the current online vehicle data systems present pricing probabilities, the current state of these vehicle data systems are also inadequate as a result of a number of technical problems pertaining to the functionality of the computer based online systems themselves.

These technical problems are related to the collection of data from a number of heterogeneous data sources, the filtering and enhancement of the collected data and the speed of the processing and communications of such online vehicle data systems. In particular, these inadequacies stem from deficiencies that can be loosely grouped into two interrelated categories: the lack of ability to both distribute vehicle data in real-time over such online networks (i.e., at a speed at which a user of those online networks would expect a response under typical conditions), and ensure that the vehicle data so distributed is accurate enough to meet those users' demands. Accordingly, at least because of these speed and accuracy issues, current vehicle data systems have provided less than accurate data and in some cases have neglected to provide certain vehicle pricing data altogether.

A microcosm of these problems occurs with respect to pricing probabilities. A vehicle price at which vehicle transactions (e.g., sales and purchases of automobiles) are concluded varies in response to a variety of factors, such as make, model, geography, date, or other parameters. Both dealers and purchasers would like to know the likelihood (or probability) of selling or purchasing a vehicle at a particular price given a number of these parameters. While a large variety of vehicle data is currently distributed across heterogeneous computer networks such as the Internet, it has heretofore been virtually impossible to collect, filter, enhance and process that data to present, in real-time, accurate pricing likelihoods based on various parameters. Accordingly, a myriad number of problems exist with current approaches to pricing solutions for vehicles and other commodities. One such problem is that a dealer or consumer may not have any context to determine when, or if, a price that is offered (e.g., to sell or purchase a vehicle) is likely to be accepted. This confusion may be exacerbated given the number of variables which may have a bearing on a particular potential transaction, including the particular locale where the consumer intends to purchase (or a dealer intends to sell) the specific configuration of vehicle desired.

There are therefore a number of unmet desires when it comes to obtaining new or used vehicle pricing. What is desired, therefore, are systems and methods to collect this vehicle data from across a distributed heterogeneous computer networks, filter and enhance that data, and present accurate pricing likelihoods for specified vehicle configurations in real-time over a computer network.

To meet those desires among others, attention is now directed to vehicle data systems for the rule based collection of vehicle data from across a distributed heterogeneous computer networks; rule based filtering and enhancing of that data; determination of rule set pertaining to determination of pricing likelihood; and the real-time presentation of accurate pricing likelihoods for specified vehicle configurations over a computer network. In particular, embodiments of a vehicle data system may obtain actual sales transaction data from a variety of data source distributed across a heterogeneous computer network. This historical transaction data may be filtered and enhanced based on a set of rules to aggregate the vehicle data into data sets. The data sets processed to determine desired pricing data, where this determined pricing data may be associated with a particular configuration in a particular geography (e.g. make, model, power train, options, locale, etc.) of a vehicle. A set of likelihood rules can be determined for each of the data sets associated with a particular configuration or geography of vehicle. An overall set of likelihood rules can be determined based on the set of likelihood rules for each of the configurations and geographies.

The vehicle data system may present an interface to a user at the user's computer device over the computer network where a user may provide relevant information such as attributes of a desired vehicle configuration, a geographic area, or other parameters through the interface. The vehicle data system can apply the overall set of likelihood rules based on the parameters (e.g., vehicle configuration, geography, etc.) to generate, in real-time, a likelihood of a price being accepted (e.g., by a seller or purchaser). This likelihood may be generated by selecting a set of dealers based on the user's locale and applying the likelihood rules to historical transaction data or other data associated with selected set of dealers. The user can then be presented, in real-time, with a display pertinent to the provided parameters and prices utilizing the determined likelihood. Additionally, in some embodiments other data may be included on the presented interface, include data associated with an aggregated data set for a vehicle configuration, or other associated or determined pricing data such as a mean price, dealer cost or factory invoice for a desired vehicle, pricing distributions, relative price ranges, or other data. In one embodiment, this interface may be a website such that the user can go to the website to provide relevant information and the display corresponding to the provided information is presented to the user through the website in real-time. The data presented in real-time over the computer network can be accurate and account for variations in the configuration of vehicles and the geography in which the vehicle will be purchased as it is based on actual sales transaction or other vehicle data, including actual data associated with dealers where a user is likely to purchase such a vehicle.

Embodiments of the systems and methods disclosed herein may be better explained with reference to FIG. 1 which depicts one embodiment of a topology which may be used to implement embodiments of these systems and methods. Topology 100 comprises a set of entities including vehicle data system 120 (also referred to herein as the TrueCar system) which is coupled through network 170 to computing devices 110 (e.g. computer systems, personal data assistants, kiosks, dedicated terminals, mobile telephones, smart phones, etc.), and one or more computing devices at inventory companies 140, original equipment manufacturers (OEM) 150, sales data companies 160, financial institutions 182, external information sources 184, departments of motor vehicles (DMV) 180 and one or more associated point of sale locations (e.g., in this embodiment, car dealers 130). Network 170 may be for example, a wireless or wireline communication network such as the Internet or wide area network (WAN), publicly switched telephone network (PTSN), cellular network, or any other type of electronic or non-electronic communication link such as mail, courier services or the like.

Vehicle data system 120 may comprise one or more computer systems with central processing units executing instructions embodied on one or more computer readable media where the instructions are configured to perform at least some of the functionality associated with embodiments of the present invention. These applications may include a vehicle data application 190 comprising one or more applications (instructions embodied on a computer readable media) configured to implement an interface module 192, data gathering module 194 and processing module 196 utilized by the vehicle data system 120.

Furthermore, vehicle data system 120 may include data store 122 operable to store obtained data 124, data 126 determined during operation, models 128 which may comprise a set of dealer cost model, price ratio models, likelihood models or any other type of data associated with embodiments of the present invention or determined during the implementation of those embodiments. In one embodiment, the obtained data 124 or the determined data 126 may include a zip code or address for a set of vehicle dealers. These vehicle dealers may be all the dealers in a geographic area (such as nationally), or dealers 130 associated with a particular network of dealers (e.g., TrueCar dealer network) or both. Additionally, for every zip code the centroid (e.g., latitude and longitude) of the zip code may be stored. In particular, in one embodiment this data may be stored in a lookup table such that the distance from every dealer to any other dealer may be determined or the distance from an dealer to a zip code (e.g., the centroid of a zip code) may be determined.

Each of the models 128 may comprise a set of rules associated with a set of vehicle parameters. In particular, these rules may comprise a rule for each of a set of a parameters, where each rule indicates the relative weighting of a vehicle parameter in determining vehicle data. Embodiments of models and their corresponding rules will be discussed in more detail at a later point herein.

Vehicle data system 120 may provide a wide degree of functionality including utilizing one or more interfaces 192 configured to for example, receive and respond to queries from users at computing devices 110 in real-time; interface with inventory companies 140, manufacturers 150, sales data companies 160, financial institutions 170, DMVs 180 or dealers 130 to obtain data; or provide data obtained, or determined, by vehicle data system 120 to any of inventory companies 140, manufacturers 150, sales data companies 160, financial institutions 182, DMVs 180, external data sources 184 or dealers 130. It will be understood that the particular interface 192 utilized in a given context may depend on the functionality being implemented by vehicle data system 120, the type of network 170 utilized to communicate with any particular entity, the type of data to be obtained or presented, the time interval at which data is obtained from the entities, the types of systems utilized at the various entities, etc. Thus, these interfaces may include, for example web pages, web services, a data entry or database application to which data can be entered or otherwise accessed by an operator, or almost any other type of interface which it is desired to utilize in a particular context.

In general, then, using these interfaces 192 vehicle data system 120 may obtain data from a variety of sources, including one or more of inventory companies 140, manufacturers 150, sales data companies 160, financial institutions 182, DMVs 180, external data sources 184 or dealers 130 and store such data in data store 122. This data may be then grouped, analyzed or otherwise processed by vehicle data system 120 to determine or enhance desired data 126 or models 128 which are also stored in data store 122.

A user at computing device 110 may access the vehicle data system 120 through the provided interfaces 192 and specify certain parameters, such as a desired vehicle configuration or incentive data the user wishes to apply, if any. The vehicle data system 120 can select a particular set of data in the data store 122 based on the user specified parameters, process the set of data using processing module 196 and models 128, generate interfaces using interface module 192 using the selected data set and data determined from the processing, and present these interfaces to the user at the user's computing device 110. More specifically, in one embodiment interfaces 192 may visually present the selected data set to the user in a highly intuitive and useful manner.

In particular, in one embodiment, a visual interface may present at least a portion of the selected data set as a price curve, likelihood curve, bar chart, histogram, etc. that reflects quantifiable prices or price ranges (e.g. "average," "good," "great," "overpriced" etc.) relative to reference pricing data points (e.g., invoice price, MSRP, dealer cost, market average, internet average, etc.). Using these types of visual presentations may enable a user to better understand the pricing data related to a specific vehicle configuration. Additionally, by presenting data corresponding to different vehicle configurations in a substantially identical manner, a user can easily make comparisons between pricing data associated with different vehicle configurations. To further aid the user's understanding of the presented data, the interface may also present data related to incentives which were utilized to determine the presented data or how such incentives were applied to determine presented data.

Turning to the various other entities in topology 100, dealer 130 may be a retail outlet for vehicles manufactured by one or more of OEMs 150. To track or otherwise manage sales, finance, parts, service, inventory and back office administration needs dealers 130 may employ a dealer management system (DMS) 132. Since many DMS 132 are Active Server Pages (ASP) based, transaction data 134 may be obtained directly from the DMS 132 with a "key" (for example, an ID and Password with set permissions within the DMS system 132) that enables data to be retrieved from the DMS system 132. Many dealers 130 may also have one or more web sites which may be accessed over network 170, where pricing data pertinent to the dealer 130 may be presented on those web sites, including any pre-determined, or upfront, pricing. This price is typically the "no haggle" (price with no negotiation) price and may be deemed a "fair" price by vehicle data system 120.

Inventory companies 140 may be one or more inventory polling companies, inventory management companies or listing aggregators which may obtain and store inventory data from one or more of dealers 130 (for example, obtaining such data from DMS 132). Inventory polling companies are typically commissioned by the dealer to pull data from a DMS 132 and format the data for use on websites and by other systems. Inventory management companies manually upload inventory information (photos, description, specifications) on behalf of the dealer. Listing aggregators get their data by "scraping" or "spidering" websites that display inventory content and receiving direct feeds from listing websites (for example, Autotrader, FordVehicles.com).

DMVs 180 may collectively include any type of government entity to which a user provides data related to a vehicle. For example, when a user purchases a vehicle it must be registered with the state (for example, DMV, Secretary of State, etc.) for tax and titling purposes. This data typically includes vehicle attributes (for example, model year, make, model, mileage, etc.) and sales transaction prices for tax purposes.

Financial institution 182 may be any entity such as a bank, savings and loan, credit union, etc. that provides any type of financial services to a participant involved in the purchase of a vehicle. For example, when a buyer purchases a vehicle they may utilize a loan from a financial institution, where the loan process usually requires two steps: applying for the loan and contracting the loan. These two steps may utilize vehicle and consumer information in order for the financial institution to properly assess and understand the risk profile of the loan. Typically, both the loan application and loan agreement include proposed and actual sales prices of the vehicle.

Sales data companies 160 may include any entities that collect any type of vehicle sales data. For example, syndicated sales data companies aggregate new and used sales transaction data from the DMS 132 systems of particular dealers 130. These companies may have formal agreements with dealers 130 that enable them to retrieve data from the dealer 130 in order to syndicate the collected data for the purposes of internal analysis or external purchase of the data by other data companies, dealers, and OEMs.

Manufacturers 150 are those entities which actually build the vehicles sold by dealers 130. In order to guide the pricing of their vehicles, the manufacturers 150 may provide an Invoice price and a Manufacturer's Suggested Retail Price (MSRP) for both vehicles and options for those vehicles—to be used as general guidelines for the dealer's cost and price. These fixed prices are set by the manufacturer and may vary slightly by geographic region.

External information sources 184 may comprise any number of other various source, online or otherwise, which may provide other types of desired data, for example data regarding vehicles, pricing, demographics, economic conditions, markets, locale(s), consumers, etc. A used car data source 186 may include sources of data regarding used car sales, as well as sources of market making information for used car sales. Used car data sources may include aggregators of used car sale data and used vehicle valuators such as Kelley, Edmunds and NADA. Used car data sources may provide data regarding multiple price points that are of interest to participants in used car sales, including specifically list prices, sale prices, and trade-in prices.

It should be noted here that not all of the various entities depicted in topology 100 are necessary, or even desired, in embodiments of the present invention, and that certain of the functionality described with respect to the entities depicted in topology 100 may be combined into a single entity or eliminated altogether. Additionally, in some embodiments other data sources not shown in topology 100 may be utilized. Topology 100 is therefore exemplary only and should in no way be taken as imposing any limitations on embodiments as disclosed.

Before delving into the details of various it may be helpful to give a general overview of an embodiment the present invention with respect to the above described embodiment of a topology, again using the example commodity of vehicles. At certain intervals then, vehicle data system 120 may obtain by gathering (for example, using interface 192 to receive or request) data from one or more of inventory companies 140, manufacturers 150, sales data companies 160, financial institutions 182, DMVs 180, external data sources 184 or dealers 130. This data may include sales or other historical transaction data for a variety of vehicle configurations, inventory data, registration data, finance data, vehicle data, etc. (the various types of data obtained will be discussed in more detail later).

It should be noted that differing types of data may be obtained at different time intervals, where the time interval utilized in any particular embodiment for a certain type of data may be based, at least in part, on how often that data is updated at the source, how often new data of that type is generated, an agreement between the source of the data and the providers of the vehicle data system 120 or a wide variety of other factors. Once such data is obtained and stored in data store 122, it may be analyzed and otherwise processed to yield data sets corresponding to particular vehicle configurations (which may include, for example, include vehicle make, model, power train, options, etc.) and geographical areas (national, regional, local, city, state, zip code, county, designated market area (DMA), or any other desired geographical area). In some embodiments, it may be advantageous to collect data at night, after the close of dealers' business hours or other periods of low demand on vehicle data system 120 or other entities in topology 100.

At some point then, a user at a computing device may access vehicle data system 120 using one or more interfaces 192 such as a set of web pages provided by vehicle data system 120. Using this interface 192 a user may specify a vehicle configuration by defining values for a certain set of vehicle attributes (make, model, trim, power train, options, etc.) or other relevant information such as a geographical location. In the case of a used car, the user may also specify additional attributes, such as mileage or vehicle condition. Using interface 192, the user may also specify a purchase date, or window of purchase dates of interest. The user specified vehicle data may be used to locate one or more components previously determined and stored in a back-end process by the vehicle data system and associated with the specified vehicle configuration or geographic data provided by the user. These components may include one more previously determined models 128 such as a likelihood model. These components may then be utilized to determine and present likelihood of price acceptance data for the specified vehicle and user specified price in real-time over the network 170 using a generated interface 192.

In particular, likelihood of price acceptance data associated with the specified vehicle configuration may be determined and presented to the user in a visual manner. Specifically, in one embodiment, a probability (or likelihood) curve associated with a price range where the probability curve represents the likelihood of prices across a range being accepted may be visually displayed to a user. Other vehicle data may be presented to the user in the visual interface, such as a price curve representing actual transaction data associated with the specified vehicle configuration (which may or may not have been adjusted) or visual references indicating one or more price ranges and one or more reference price points (e.g., invoice price, MSRP, dealer cost, average price paid, dealer cost, internet average, etc.). In some embodiments, these visual indicators may be displayed such that a user can easily determine what percentage of consumers paid a certain price or the distribution of prices within certain price ranges.

Figure 2A:
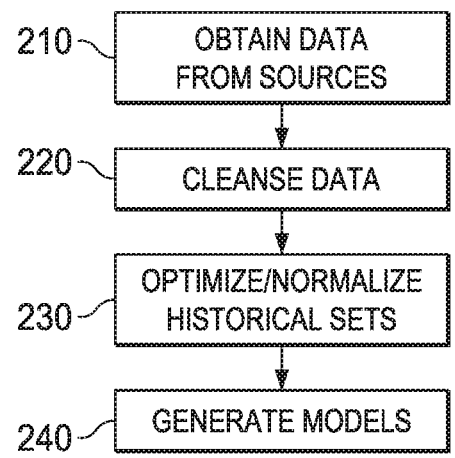
FIGS. 2A and 2B depict one embodiment of a method for determining and presenting likelihood of price acceptance predictions.
Figure 2B:
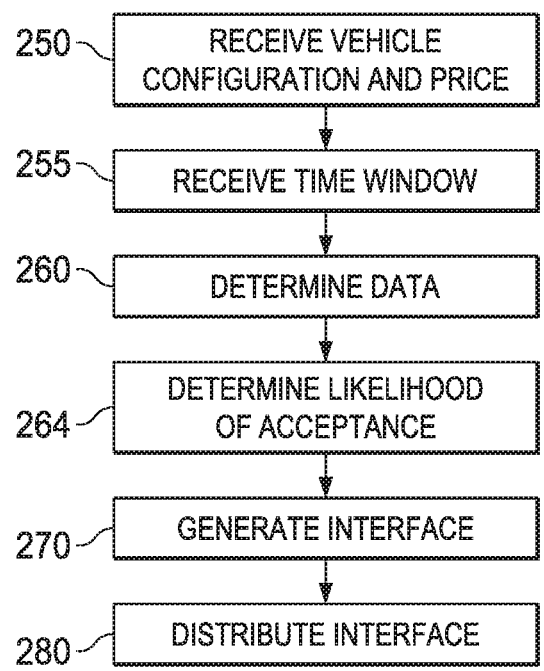

Turning now to FIGS. 2A and 2B, an embodiment of aspects of the operation of a vehicle data system are depicted. Referring first to the embodiment of FIG. 2A, at step 210 data can be obtained from one or more of the data sources (inventory companies 140, manufacturers 150, sales data companies 160, financial institutions 182, DMVs 180, external data sources 184, dealers 130, etc.) coupled to the vehicle data system 120 and the obtained data can be stored in the associated data store 122. In particular, obtaining data may comprise gathering the data by requesting or receiving the data from a data source. It will be noted with respect to obtaining data from data sources that different data may be obtained from different data sources at different intervals, and that previously obtained data may be archived before new data of the same type is obtained and stored in data store 122.

In certain cases, some of the operators of these data sources may not desire to provide certain types of data, especially when such data includes personal information or certain vehicle information (VIN numbers, license plate numbers, etc.). However, in order to correlate data corresponding to the same person, vehicle, etc. obtained from different data sources it may be desirable to have such information. To address this problem, operators of these data sources may be provided a particular hashing algorithm and key by operators of vehicle data system 120 such that sensitive information in data provided to vehicle data system 120 may be submitted and stored in data store 122 as a hashed value. Because each of the data sources utilizes the same hashing algorithm to hash certain provided data, identical data values will have identical hash values, facilitating matching or correlation between data obtained from different (or the same) data source(s). Thus, the data source operators' concerns can be addressed while simultaneous avoiding adversely impacting the operation of vehicle data system 120.

Once data is obtained and stored in data store 122, the obtained data may be enhanced. This enhancing may include for example, cleansing at step 220 and optimization/normalization of sample sets at step 230. The cleansing of data may include evaluation of the data to determine if it conforms to known values, falls within certain ranges or is duplicative. When such data is found, it may be removed from the data store 122, the values which are incorrect or fall outside a threshold may be replaced with one or more values (which may be known specifically or be default values), or some other action entirely may be taken.

This cleansed data may then be used to form and optimize sample sets of data at step 230. Normalization may include converting historical sales data which is expressed in dollars or other currencies into price ratios comprising the sale price divided by the MSRP, upfront price (UFP) or other reference value. In this way, historical sales data may be normalized. Normalization may also include performing adjustments (e.g., applying one or more adjustment factors) to account for inherent differences in how vehicle prices are reported. The application of such adjustment factors may prevent the differing (or changing) percentages of data coming from each source from impacting the accuracy of results.

The formation and optimization process may include grouping data into data sets according to geography (for example, national, regional, local, state, county, zip code, DMA, some other definition of a geographic area such as within 500 miles of a location, etc.) and optimizing these geographic data sets for a particular vehicle configuration. In the case of used vehicles, the optimization may further comprise grouping data into sets according to mileage, condition or other parameters of particular interest to buyers and sellers of used vehicles. This optimization process may result in one or more data sets corresponding to a particular vehicle or group or type of vehicles, a set of attributes of a vehicle and an associated geography.

Using the data sets resulting from the optimization process, a set of models may be generated at step 240. These models may include a set of dealer cost models corresponding to one or more of the data sets resulting from the optimization process discussed above. An average price ratio (for example, price paid/dealer cost) model for the data set may also be generated using the obtained data.

These models may also include a predictive model, which may include rules for determining a forecast of the expected market price (expressed in a currency or as a price ratio) of a given vehicle at a specified time. The predictive model may also include rules for providing a forecast of the vehicle's market price in a particular locality, or nationally These models may include a likelihood model that includes a set of rules for determining a probability of the acceptance of a particular price (e.g., including a price range) by a seller of a vehicle given a set of parameters associated with the vehicle (e.g., year, make model, geographic locale, etc.) or time period of purchase. In particular, in certain embodiments this likelihood model may relate the price of vehicle sales to attributes of the sale transaction such that by providing values for those attributes from sales transactions to the likelihood model an expected price (or price ratio) at which a vehicle will sell may be determined along with one or more standard deviations or confidence intervals associated with the expected price. In one embodiment, for example, the likelihood model include one or more rules foe generating a cumulative distribution function for a set of completed historical vehicle transactions.

The models may also include a low volume model, to account for cases involving rare cars or other cases where the volume of data is insufficient to generate or obtain meaningful results by applying the one or more of the models. For example, a low volume likelihood model may be included to generate a likelihood function where the volume of data is insufficient to generate or obtain meaningful results by applying the likelihood model. It will be noted that these models may be updated at certain intervals, where the interval at which each of the dealer cost models, average price ratio model, predictive model or likelihood model is generated may, or may not, be related to the intervals at which data is obtained from the various data sources or the rate at which the other model(s) are generated.

Moving on to the portion of the embodiment depicted in FIG. 2B, at step 250 the vehicle data system 120 may receive a specific vehicle configuration through a provided interface

192. In one embodiment, for example, a user at a web page provided by vehicle data system 120 may select a particular vehicle configuration using one or more menus or may navigate through a set of web pages to provide the specific vehicle configuration and specified price (e.g., at which the user wishes to purchase the vehicle). This specified vehicle configuration may comprise values for a set of attributes of a desired vehicle such as a make, model, trim level, one or more options, etc. The user may also specify a geographic locale where he is located or where he intends to purchase or sell a vehicle of the provided specification. At step 255, the user may also specify a purchase date or a range of purchase dates of interest.

Other information which a user may provide includes incentive data pertaining to the specified vehicle configuration. In one embodiment, when a user specifies a particular vehicle configuration the vehicle data system 120 will present the user with a set of incentives associated with the specified vehicle configuration if any are available. The user may select zero or more of these incentives to apply.

Pricing data associated with the specified vehicle configuration may then be determined by the vehicle data system 120 at step 260. This data may include adjusted transaction prices, mean, median, and probability distributions for pricing data associated with the specified vehicle configuration within certain geographical areas (including, for example, the geographic locale specified); calculating a set of quantifiable price points or ranges (e.g. "average," "good," "great," "overpriced," etc. prices or price ranges); determining historical price trends or pricing forecasts; or determining any other type of desired data. In one embodiment, the data associated with the specified vehicle configuration may be determined using the price ratio model, likelihood model or historical transaction data associated with the specified vehicle configuration as will be discussed.

In one embodiment, the data may be selected using predetermined control logic to ensure a proper sample size. In some embodiments, the control logic may comprise a fallback binning logic, wherein the historical data may be grouped into a series of "bins" of historical sales data, and a data set is determined by choosing the bin of historical sales data for transactions most analogous (such as in terms of vehicle trim level, or proximity in time or location) to the parameters specified by the user at steps 250 or 255.

In a particular embodiment, the pricing data selected may be associated with one or more selected dealers within the geographic area specified by the user, where the dealer has offered an upfront price for a vehicle similar to the specified vehicle configuration and has completed one or more transactions for a vehicle similar to the specified vehicle. In one embodiment, the set of dealers (e.g., within a geographic area of the user) may be scored. The dealer scores associated with the dealers that are within the geographic area of the user may be used to select a set of dealers (e.g., the top five with the highest (or lowest) scores) and pricing data associated with the selected dealers may be selected as the pricing data to utilize. Embodiments of such dealer scoring is discussed in U.S. Pat. No. 8,868,480, issued on Oct. 21, 2014 to McBride et al, which is hereby incorporated herein by reference for all purposes.

Using data from the selected bin of historical data, a probability or probability distribution (collectively probability or likelihood) that a purchase price will be accepted using price ratios determined from the set of historical data may be calculated at step 264. In particular, a set of rules defining a likelihood model may be applied to the historical transaction data to determine the probability that the vehicle price provided by the user through the interface will be accepted by a dealer using a price ratio determined for dealers of the vehicle of the specified vehicle configuration based on, for example, historical price ratios determined for the vehicle of the specific configuration, a known price ratio acceptable for a dealer (e.g., based on an upfront price provided for the vehicle by the dealer) or other methods of determining price ratios acceptable to the dealer for the vehicle of interest. In particular, a likelihood or likelihood distribution may be determined based on the standard deviation of the price provided by the user from an acceptable or other price ratio determined for a dealer. Such a distribution may be, for example, a cumulative distribution function determined from the set of pricing data.

An interface for presentation of the determined pricing data associated with the specified vehicle configuration may then be generated at step 270. These interfaces may comprise a visual presentation of such data using, for example, bar charts, histograms, curves with indicators of certain price points, graphs with trend lines indicating historical trends or price forecasts, or any other desired format for the visual presentation of data. In particular, in one embodiment, the determined probability may be displayed as a probability distribution curve representing a probability on one axis with a price range on the other axis.

In some embodiments there may be visual indicators on, or under, the curve which indicate determined price points or ranges, such as one or more quantifiable prices or one or more reference price points (for example, invoice price, MSRP, dealer cost, market average price paid, dealer cost, internet average, etc.). Thus, using an embodiment of such an interface a user can easily determine the probability of having an offered or desired price accepted by a dealer, along with the effect of increasing or lowering an offered price. It should be noted here that though the interfaces elaborated on with respect to the presentation of data to a user in conjunction with certain embodiments are visual interfaces, other interfaces which employ audio, tactile, some combination, or other methods entirely may be used in other embodiments to present such data.

The interfaces may be distributed through a variety of channels at step 280. The channels may comprise a consumer facing network based application (for example, a set of web pages provided by vehicle data system 120 which a consumer may access over a network at a computing device such as a computer or mobile phone and which are tailored to the desires of, or use by, consumers); a dealer facing network based application (a set of web pages provided by the vehicle data system 120 which are tailored to the desires of, or use by, dealers); text or multimedia messaging services; widgets for use in web sites or in other application setting, such as mobile phone applications; voice applications accessible through a phone; or almost any other channel desired. It should be noted that the channels described here, and elsewhere, within this disclosure in conjunction with the distribution of data may also be used to receive data (for example, a user specified vehicle configuration or the like), and that the same or some combination of different channels may be used both to receive data and distribute data.

As may be apparent from a review of the above discussion, embodiments of vehicle data system 120 may entail a number of processes occurring substantially simultaneously or at different intervals and that many computing devices 110 may desire to access vehicle data system 120 at any given point. Accordingly, in some embodiments, vehicle data system 120 may be implemented utilizing an architecture or infrastructure that facilitates cost reduction, performance, fault tolerance, efficiency and scalability of the vehicle data system 120. Embodiments of such an architecture may facilitate the determination and presentation of vehicle pricing data in real-time to a user of embodiments of a vehicle data system.

Figure 3:
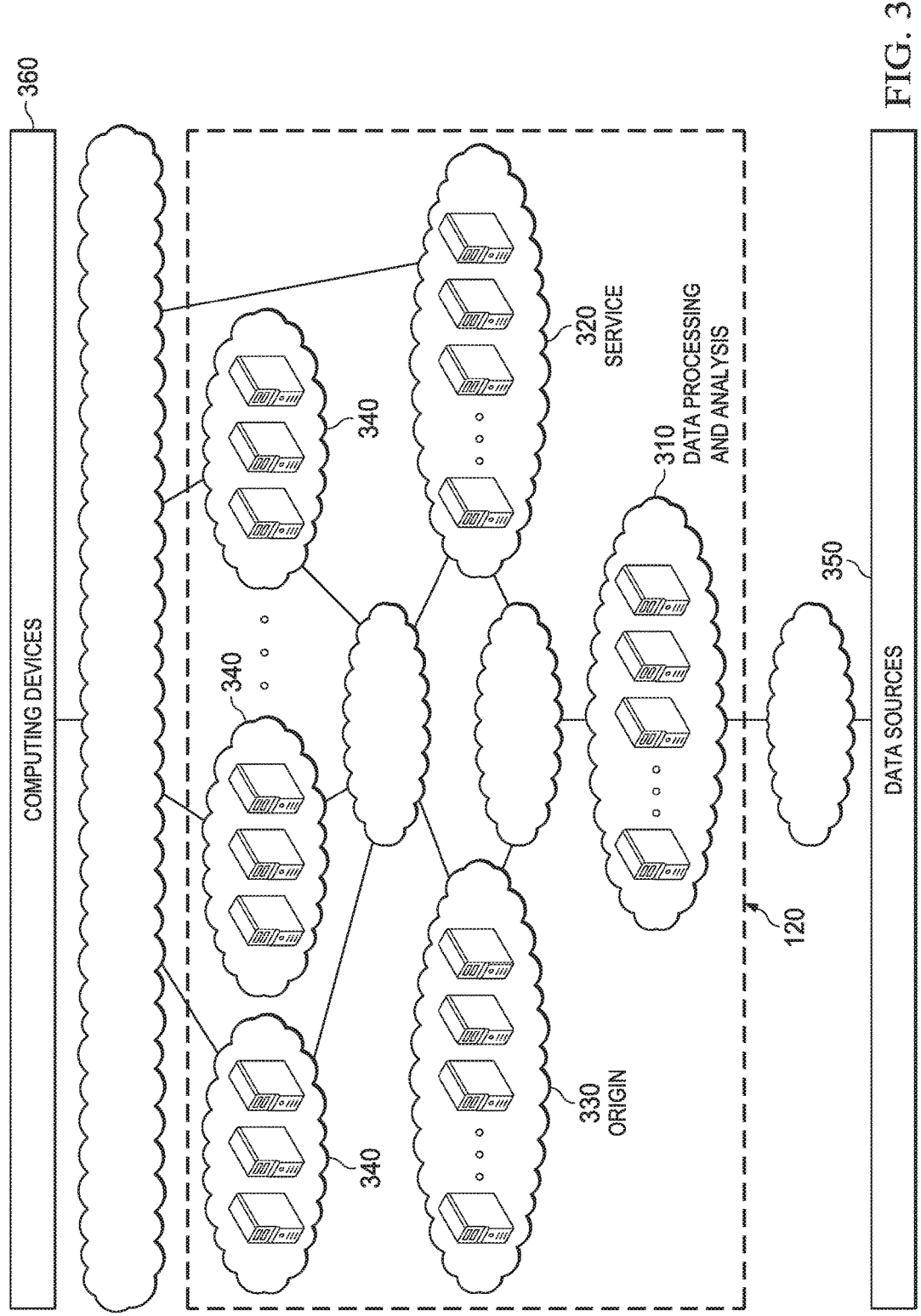
FIG. 3 depicts one embodiment of an architecture for a vehicle data system.

One embodiment of such an architecture is depicted in FIG. 3. Specifically, one embodiment of vehicle data system 120 may be operable to provide a network based interface including a set of web pages accessible over the network, including web pages where a user can specify a desired vehicle configuration and receive pricing data corresponding to the specified vehicle configuration. Such a vehicle data system 120 may be implemented utilizing a content delivery network (CDN) comprising data processing and analysis servers 310, services servers 320, origin servers 330 and server farms 340 distributed across one or more networks, where servers in each of data processing and analysis servers 310, services servers 320, origin servers 330 and server farms 340 may be deployed in multiple locations using multiple network backbones or networks where the servers may be load balanced.

The vehicle data system may include a back-end comprising data processing and analysis servers 320 which may interact with one or more data sources 350 (examples of which are discussed above) to obtain data from these data sources 350 at certain time intervals (for example, daily, weekly, hourly, at some ad-hoc variable interval, etc.) and process this obtained data as discussed both above in more detail later herein. This processing includes, for example, the cleansing of the obtained data, determining and optimizing sample sets, the generation of models, etc.

The back-end may also include origin servers 330 which may populate a web cache at each of server farms 340 with content for the provisioning of the web pages of the interface to users at computing devices 360 (examples of which are discussed above). Server farms 340 may provide the set of web pages to users at computing devices 110 using web caches at each server farm 340. More specifically, users at computing devices 360 connect over the network to a particular server farm 340 such that the user can interact with the web pages to submit and receive data through the provided web pages. In association with a user's use of these web pages, user requests for content may be algorithmically directed to a particular server farm 340. For example, when optimizing for performance locations for serving content to the user may be selected by choosing locations that are the fewest hops, the fewest number of network seconds away from the requesting client or the highest availability in terms of server performance (both current and historical), so as to optimize delivery across the network.

Certain of the web pages or other interfaces provided by vehicle data system 120 may allow a user to request services, interfaces or data which cannot be provided by server farms 340, such as requests for data which is not stored in the web cache of server farms 340 or analytics not implemented in server farms 340. User requests which cannot be serviced by server farm 340 may be routed to one of service servers 330. These requests may include requests for complex services which may be implemented by service servers 330, in some cases utilizing the data obtained or determined using data processing and analysis servers 310.

Figure 4A:
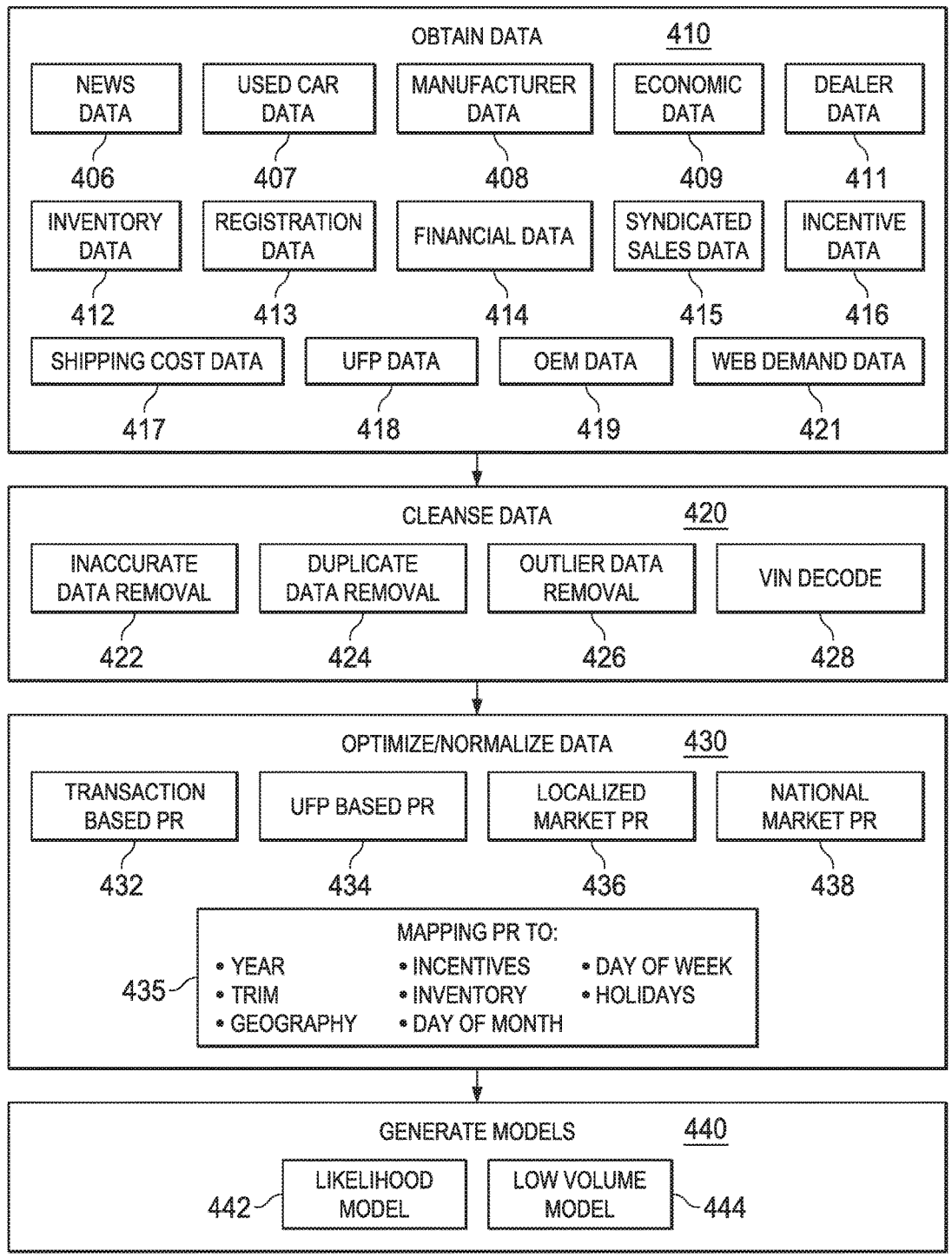
FIGS. 4A and 4B depict one embodiment of the architecture and operation of a vehicle data system.
Figure 4B:
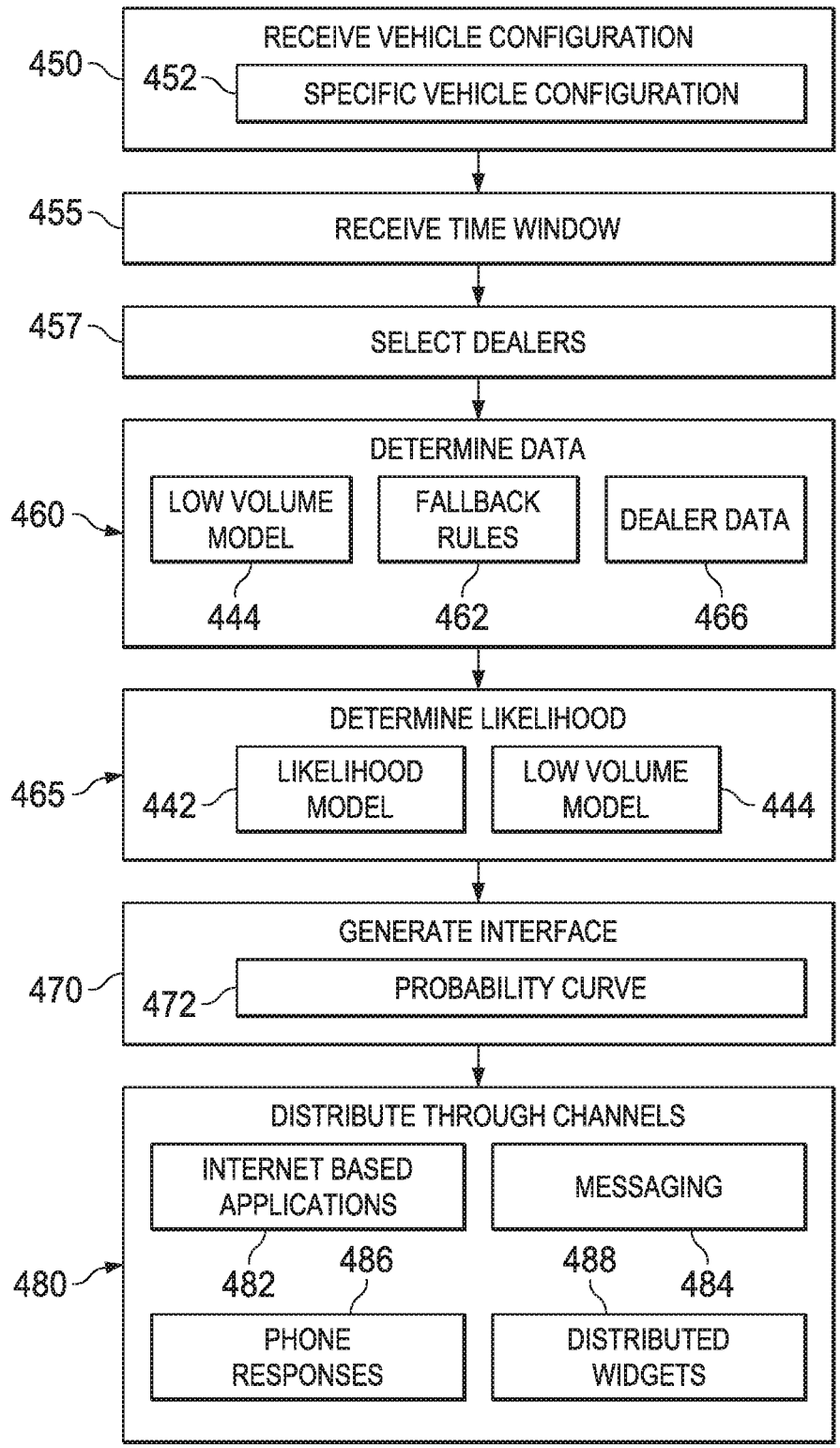

It may now be useful to go over in more detail, embodiments of methods for the operation of a vehicle data system which may be configured or operate according to embodiments of the above described architecture or another architecture altogether. FIGS. 4A and 4B depict one embodiment of how such a system may be configured to operate. Referring first to FIG. 4A, a diagram for an embodiment of a back-end process for obtaining and determining various data and models that may be utilized by a vehicle data system is depicted. Such a back-end process can be performed asynchronously to one or more front-end processes to increase the speed and efficiency of the processing occurring in the front-end processes in order that these front-end processes can achieve the speed and efficiency necessary to return results to users of a vehicle data system in real-time.

Initially, at step 410 data can be obtained from one or more of the data sources coupled to the vehicle data system and the obtained data stored in a data store. The data obtained from these various data sources may be aggregated from the multiple sources and normalized. The various data sources and the respective data obtained from these data sources may include some combination of DMS data 411, inventory data 412, registration or other government (DMV, Sec. of State, etc.) data 413, finance data 414, syndicated sales data 415, incentive data 416, shipping cost data 417, upfront pricing data 418, OEM pricing data 419, manufacturer data 408, used car data 407, news/weather data 406 or economic data 409.

DMS data 411 may be obtained from a DMS at a dealer. The DMS is a system used by vehicle dealers to manage sales, finance, parts, service, inventory or back office administration needs. Thus, data which tracks all sales transactions for both new and used cars sold at retail or wholesale by the dealer may be stored in the DMS and obtained by the vehicle data system. In particular, this DMS data 411 may comprise data on sales transactions which have been completed by the dealer (referred to as historical sales transactions), including for example, an identification of a vehicle's VIN, make, model, trim, etc., data of purchase, geographic location of purchase, purchase price, optional services purchased, optional equipment purchased, identity of the dealership, identity of the purchaser, demographic data related to the purchaser, dealership costs associated with a particular transaction or the like. As most DMS are Active Server Pages (ASP) or Java Server Pages (JSP) based, in some embodiments the sales transaction or other DMS data 411 can be obtained directly from the DMS or DMS provider utilizing a "key" (for example, an ID and Password with set permissions) that enables the vehicle data system or DMS polling companies to retrieve the DMS data 411, which in one embodiment, may be obtained on a daily or weekly basis.

Inventory data 412 may be detailed data pertaining to vehicles historically or currently within a dealer's inventory, or which will be in the dealer's inventory at some point in the future. Inventory data 412 can be obtained from a DMS, inventory polling companies, inventory management companies or listing aggregators. Inventory polling companies are typically commissioned by a dealer to pull data from the dealer's DMS and format the data for use on web sites and by other systems. Inventory management companies manually upload inventory information (for example, photos, descriptions, specifications, etc. pertaining to a dealer's inventory) to desired locations on behalf of the dealer. Listing aggregators may get data by "scraping" or "spidering" web sites that display a dealer's inventory (for example, photos, descriptions, specifications, etc. pertaining to a dealer's inventory) or receive direct feeds from listing websites (for example, FordVehicles.com).

Registration or other government data 413 may also be obtained at step 410. When a buyer purchases a vehicle it must be registered with the state (for example, DMV, Secretary of State, etc.) for tax, titling or inspection purposes. This registration data 413 may include vehicle description information (for example, model year, make, model, mileage, etc.) and a sales transaction price which may be used for tax purposes. Thus, this data may also include historical transaction data.

Finance and agreement data 414 may also be obtained. When a buyer purchases a vehicle using a loan or lease product from a financial institution, the loan or lease process usually requires two steps: applying for the loan or lease and contracting the loan or lease. These two steps utilize vehicle and consumer information in order for the financial institution to properly assess and understand the risk profile of the loan or lease. This finance application or agreement data 414 may also be obtained at step 410. In many cases, both the application and agreement include proposed and actual sales prices of the vehicle.

Embodiments of the vehicle data system may also be configured to obtain syndicated sales data 415 at step 410. Syndicated sales data companies aggregate new and used sales transaction data from the DMS of dealers associated with a particular network of dealers (e.g., TrueCar dealer network) or with whom they are partners or have a contract. These syndicated sales data companies may have formal agreements with dealers that enable them to retrieve transaction data in order to syndicate the transaction data for the purposes of analysis or purchase by other data companies, dealers or OEMs. Accordingly, this data may also include historical transaction data.

Incentive data 416 can also be obtained by the vehicle data system. OEMs use manufacturer-to-dealer and manufacturer-to-consumer incentives or rebates in order to lower the transaction price of vehicles or allocate additional financial support to the dealer to help stimulate sales. As these rebates are often large (2%-20% of the vehicle price) they can have a dramatic effect on vehicle pricing. These incentives can be distributed to consumers or dealers on a national or regional basis. As incentives may be vehicle or region specific, their interaction with pricing can be complex and an important tool for understanding transaction pricing. This incentive data can be obtained from OEMs, dealers or another source altogether such that it can be used by the vehicle data system to determine accurate transaction, or other, prices for specific vehicles.

As dealers may have the opportunity to pre-determine pricing on their vehicles it may also be useful to configure the vehicle data system to obtain this upfront pricing data 418 at step 410. Companies like Zag.com Inc. enable dealers to input pre-determined, or upfront, pricing to consumers. This upfront price is typically the "no haggle" (price with no negotiation) price. Many dealers also present their upfront price on their websites and even build their entire business model around the notion of "no negotiation" pricing. These values may be used for a variety of reasons, including determination of pricing likelihoods, providing a check on the transaction prices associated with obtained historical transaction data. In one embodiment, this upfront pricing data 418 may include upfront prices for a set of vehicle dealers. These vehicle dealers may be all the dealers associated with a particular network of dealers (e.g., TrueCar dealer network) such that the upfront pricing offered by these dealers can be presented in association with vehicle data through the vehicle data system as described in U.S. Pat. No. 7,945,483 issued May 17, 2011 to Inghelbrecht et al which is incorporated herein by reference in its entirety.

Additionally, the vehicle data system may be configured to obtain OEM pricing data 419 at step 410. This OEM pricing data may provide important reference points for the transaction price relative to vehicle and dealer costs. OEMs usually set two important numbers in the context of vehicle sales, invoice price and MSRP (also referred to as sticker price) to be used as general guidelines for the dealer's cost and price. These are fixed prices set by the manufacturer and may vary slightly by geographic region. The invoice price is what the manufacturer charges the dealer for the vehicle. However, this invoice price does not include discounts, incentives, or holdbacks which usually make the dealer's actual cost lower than the invoice price. According to the American Automobile Association (AAA), the MSRP is, on average, a 13.5% difference from what the dealer actually paid for the vehicle. Therefore, the MSRP is almost always open for negotiation. An OEM may also define what is known as a dealer holdback, or just a holdback. Holdback is a payment from the manufacturer to the dealer to assist with the dealership's financing of the vehicle. Holdback is typically a percentage (2 to 3%) of the MSRP.

Although the MSRP may not equate to an actual transaction price, an invoice price can be used to determine an estimate of a dealer's actual cost as this dealer cost is contingent on the invoice. In some embodiments, this dealer cost can be defined as invoice price less any applicable manufacturer-to-dealer incentives or holdbacks. The vehicle data system may therefore utilize the invoice price of a vehicle associated with a historical transaction to determine an estimate of the dealer's actual cost which will enable it to determine "front-end" gross margins (which can be defined as the transaction price less dealer cost and may not include any margin obtained on the "back end" including financing, insurance, warranties, accessories and other ancillary products).

Data may also be obtained from a wide variety of other data sources, including economic data 409 related to the current, past or future state of almost any facet of the economy including vehicle demand, gas prices, demographic data such as household income, markets, locale(s), consumers, or almost any other type of data desired. The economic data may be specific to, or associated with, a certain geographic area. Additionally, this economic data may comprise an internet index, which may be determined from the average price for a vehicle as reported by certain Internet research sites as the average price for a vehicle. Although these Internet research sites are typically consumer focused, they sell advertising and leads to the automotive dealerships; therefore their paying customers are dealerships and the prices on these sites tend to represent the higher end of the scale, favoring dealerships.

Historical web demand data 405 may also be obtained or tracked. This data may include data on searches or requests for particular vehicles or vehicle configurations, including, for example, tracked web log information, web statistics information, or other data that may be reflective or related to demand for a particular vehicle.

Other sources from which the vehicle data system may obtain data include manufacturer data 408, which may include manufacturers' suggested retail prices (MSRP), information about trim levels, color and VIN data which may be used as part of the data scrubbing process or elsewhere. The manufacturer data 408 may thus include vehicle configurator data associated with a vehicle, such as, e.g., year, make, model, trim, color, equipment options, service options, and/or the like.

The vehicle data system may also obtain geographic shipping cost data 417, to factor for shipping cost variations, such as to markets outside the continental United States, including Hawaii, Alaska or Guam. Other sources of data may include news/weather data 406, to provide notice of events that may bear on the volume or quality of purchase activity, such as heavy snowfalls. Other sources of data may also include used car data 407, which may include widely-consulted reference or "book" values of vehicles at various combinations of year, model, mileage, condition and trim, such as those provided by Kelley, Edmund's and NADA.

Once the desired data is obtained, the vehicle data system may be configured to enhance the data by cleansing the data and optimizing or normalizing the data. The data may first be cleansed at step 420. In particular, the data obtained may not be useful if it is inaccurate, duplicative or does not conform to certain parameters. Therefore, the vehicle data system may cleanse obtained data to maintain the overall quality and accuracy of the data presented to end users. This cleansing process may entail the removal or alteration of certain data based on almost any criteria desired, where these criteria may, in turn, depend on other obtained or determined data or the evaluation of the data to determine if it conforms with known values, falls within certain ranges or is duplicative. When such data is found it may be removed from the data store of the vehicle data system, the values which are incorrect or fall outside a threshold may be replaced with one or more values (which may be known specifically or be default values), or some other action entirely may be taken.

In one embodiment, during this cleansing process a VIN decode 428 may take place, where a VIN number associated with data (for example, a historical transaction) may be decoded. Specifically, every vehicle sold must carry a Vehicle Identification Number (VIN), or serial number, to distinguish itself from other vehicles. The VIN consists of 17 characters that contain codes for the manufacturer, year, vehicle attributes, plant, and a unique identity. Vehicle data system may use an external service to determine a vehicle's attributes (for example, make, model year, make, powertrain, trim, etc.) based on each vehicle's VIN and associate the determined vehicle information with the sales transaction from which the VIN was obtained. Note that in some cases, this data may be provided with historical transaction data and may not need to occur with respect to one or more of the historical transactions. Thus, the set of historical transactions in the historical transaction data may be enhance through this VIN decoding 428 if needed to include data such as vehicle data associated with the VIN, including for example, vehicle configuration data, vehicle binning information, information associated with residence time of a particular vehicle on a dealer's lot, MSRP, or other information.

Additionally, inaccurate or incomplete data may be removed at a step 422. In one embodiment, the vehicle data system may remove any historical transaction data that does not include one or more key fields that may be utilized in the determination of one or more values associated with that transaction (for example, vehicle make, model, trim, etc.). Other high-level quality checks may be performed to remove inaccurate (including poor quality) historical transaction data. Specifically, in one embodiment, cost information (for example, dealer cost) associated with a historical transaction may be evaluated to determine if it is congruent with other known, or determined, cost values associated with the make, model or trim of the vehicle to which the historical transaction data pertains. If there is an inconsistency (for example, the cost information deviates from the known or determined values by a certain amount) the cost information may be replaced with a known or determined value or, alternatively, the historical transaction data pertaining to that transaction may be removed from the data store.

In one embodiment, for each historical transaction obtained the following actions may be performed: verifying that the transaction price falls within a certain range of an estimated vehicle MSRP corresponding to the historical transaction (e.g., 60% to 140% of MSRP of the base vehicle); verifying that the dealer cost for the transaction falls within a range of an estimated dealer cost (e.g., 70% to 130% of invoice—holdback of the base vehicle); verifying that a total gross (front end+back end gross) for the historical transaction is within an acceptable range (e.g., −20% to 50% of the vehicle base MSRP); verifying that the type of sale (new/used) aligns to the number of miles of the vehicle (for example, more than 500 miles, the vehicle should not be considered new).

Cleansing the data may also involve duplicate data removal 424. As there may be many sources for historical transaction data in many cases duplicative historical transaction data may be obtained. As such duplicative data can skew the results of the output of the vehicle data system, it may be desired to remove such duplicate data. In cases where uniquely identifiable attributes such as the VIN are available, this process is straightforward (for example, VINs associated with historical transactions may be matched to locate duplicates). In cases where the transaction data does not have a unique attribute (in other words, an attribute which could pertain to only one vehicle, such as a VIN, a combination of available attributes may be used to determine if a duplicate exists). For example, a combination of sales date, transaction type, transaction state, whether there was a trade-in on the transaction, the vehicle transaction price or the reported gross may all be used to identify duplicates. In either case, once a duplicate is identified, the transaction data comprising the most attributes source may be kept while the duplicates are discarded. Alternatively, data from the duplicate historical transactions may be combined in some manner into a single historical transaction.

Outlier data can also be removed 426. Outlier data is defined as data that does not appear to properly represent a likely transaction. In one embodiment, historical transaction data pertaining to transactions with a high negative margin (dealer loses too much money) or a high positive margin (dealers appears to earn too much money) may be removed. Removing outlier data may, in one embodiment, be accomplished by removing outlier data with respect to national, regional, local or other geographic groupings of the data, as removing outlier data at different geographic level may remove different sets of transaction data. In addition, relative or absolute trimming may be used such that a particular percentage of the transactions beyond a particular standard deviation may be removed off of the top and bottom of the historical transactions.

After step 420, cleansed data may be stored in a data store associated with the vehicle data system, where the cleansed data includes a set of historical transactions, each historical transaction associated with at least a set of vehicle attributes (for example, make, model, engine type, trim, etc.), a transaction price or front end gross or price ratio, and the transaction date. Other data, such as geography (e.g., the actual dealer, the DMA, zip code, city, etc.), available incentives, inventory data, weather, or financial data associated with each transaction or transaction date may also be stored in the data store.

At step 430, then, the cleansed data may be normalized, for example by re-expressing historical price data as a price ratio ("PR") of the sale price to one or more reference prices. The normalized historical price data may be expressed as a transaction based PR 432, an upfront price PR 434, a localized market PR 436 or a national market PR 438. The normalized data may then be mapped according to parameters 435, such as geography, time interval, available incentives, vehicle trim, whether a day is holiday, day of the month ("DoM"), day of the week ("DoW"), or inventory data. The mapped data may then be grouped into data sets using a binning process, and these data sets optimized for a particular vehicle configuration or geography. This optimization process may result in one or more data sets corresponding to a specific vehicle or group or type of vehicles, a trim level or set of attributes of a vehicle, and an associated geography.

In order to make vehicle pricing data more accurate, it may be important to maintain timeliness or relevancy of the data presented or utilized. In one embodiment, then the total number of recent (within a desired time period) and relevant transactions may be optimized with respect to the cleansed data. Relevant data corresponding to a particular geographic region and a particular vehicle may be binned to optimize the quantity of data available for each vehicle within each geographic region. This quantity of data may be optimized to yield bins of historical transaction data corresponding to a trim level (a certain set of attributes corresponding to the vehicle) of a particular model car and an associated geography using geographic assignment of data and attribute categorization and mapping to trim.

During geographic assignment of data, data is labeled with one or more of: national (all data), regional, state, or DMA definition. Attribute categorization and trim mapping may also occur. Vehicle data can be sorted at the trim level (for example, using data regarding the vehicle obtained from a VIN decode or another source). This enables the accurate presentation of relevant pricing based on similar vehicles within a given time frame (e.g., optimizing recency). In some cases, a determination may be made that there is not a threshold quantity of data for a specific vehicle at a trim level to determine a statistically significant data corresponding to a time period.

In some embodiments, the vehicle data system may analyze vehicles at the model (e.g., Accord, Camry, F-150) level and run analytics at an attribute level (for example, drivetrain, powertrain, body type, cab type, bed length, etc.) to determine if there is a consistency (correlation between attributes and trims) at the attribute level. Since there are a greater number of transactions when binning at an attribute level, attribute level binning may be used instead of trim level binning in these situations, thereby yielding a larger number of historical transactions in a particular data set (relative to just trim level binning), but still relevant, data set to use for processing.

It will be noted with respect to these data sets that data within a particular data set may correspond to different makes, models, trim levels or attributes (e.g., geography) based upon a determined correlation between attributes. For example, a particular data set may have data corresponding to different makes or models if it is determined that there is a correlation between the two vehicles. Similarly, a particular data set may have data corresponding to different trims or having different attributes if a correlation exists between those different trim levels or attributes. This binning process is described in more detail at a later point herein.

Using the bins of historical transaction data then, a set of models may be generated at step 440 and stored in the data store of the vehicle data system. In particular, this model generation process may comprise generating one or more likelihood models 442. These likelihood models may include a likelihood model for each of a set of bins of data of historical data and an overall likelihood model generated from an evaluation of the likelihood modes for each of the set of bins of historical data. These likelihood models may be later applied for likelihood determinations for which there are bins of historical data that contain a statistically sufficient number data points to apply the likelihood model. The model generation process may also comprise generating a low volume data model 444, which may be used in cases where the historical transaction data may be too limited to determine or apply a likelihood model 442.

In one embodiment, the basis for these likelihood models may be the price ratio (PR) of historical transactions for new vehicles, or inventory listings for used vehicles. In particular, in some embodiments the PR used in modeling may be the aggregated daily averages of the price ratio for all transactions in a bin (e.g., selected based on fallback logic). Gauging and numerically evaluating these factors may be accomplished by leveraging a pricing model to determine a price ratio for a similar vehicle and a standard deviation (or other metric of statistical variation) in price. These price ratios and models are discussed, for example, in U.S. Patent Application Publication No. 2010/0070343, published Mar. 18, 2010, U.S. Pat. No. 9,020,843, issued Apr. 28, 2015 and U.S. patent application Ser. No. 15/220,168 entitled "Vehicle Data System for Distribution of Vehicle Data in an Online Network Environment" by Gilmore et al filed on Jul. 26, 2016, all of which are incorporated by reference herein in their entirety for all purposes.

In one embodiment, likelihood model 442 employs a logistic regression model to fit the obtained and enhanced data to a predictive logistic function suitably adapted to compute a probability (referred to as the price probability or price likelihood) that a dealer will accept a given buyer's offered price for a vehicle having a specified configuration. In particular, the likelihood model 442 may include a set of rules to generate a cumulative distribution function for a set of historical transactions when the set of rules of the likelihood model are applied to the set of historical transactions. Thus, the likelihood model may define a cumulative distribution function as a function of a set of vehicle attributes.

A significant factor for determining the probability (or "likelihood") of price acceptance is the putative profit realized by the dealer for a particular vehicle. The putative profit is generally a function of a threshold profit criterion, vehicle supply, vehicle demand, and the number of days that the vehicle has been on the dealer's lot. This likelihood may be expressed as:

$$(\pi > \pi^* | V_s, V_d, t)$$

where $\pi > \pi^*$ represents the threshold profit criterion, namely that the putative realized profit $\pi$ is greater than the minimally acceptable profit $\pi^*$; given the following:
  the vehicle's supply $V_s$;
  the vehicle's demand $V_d$; and
  the number of days t that the vehicle has been on the dealer's lot.

As one might reasonably consider, a dealer will have a threshold profit that they are willing to accept, but not less. If an offer embodies a profit higher than the threshold profit, the offer will ultimately be accepted. If an offer embodies a profit lower than the threshold profit, the offer will not be accepted. This threshold profit number is generally unknown to the customer, and may even be unknown to the dealer in advance. The threshold profit number will, however, be correlated to the supply of similar vehicles relative to the anticipated short-term demand for those vehicles at that particular dealership. Where the dealer believes that the supply is greater than the anticipated demand, the dealer will be more likely to accept lower threshold profitability. Similarly, for vehicles sitting on the dealer's lot for quite a while, the dealer will likely be willing to accept lower profitability.

A representative implementation may comprise analyzing possible price ratios for a specific vehicle identification number (VIN) or historical transaction in accordance with the following:

A price ratio $R_p$ corresponding to an offered price may be computed as a ratio of the offered price p and, for example, the MSPR $p_{MSRP}$ in accordance with the following:

$$R_p = \frac{p}{p_{MSRP}}$$

An upfront price ratio $R_{p,u}$ may be computed as a ratio of the dealer's upfront price $p_u$ and, for example, the MSRP $p_{MSRP}$ in accordance with the following:

$$R_{p,u} = \frac{p_u}{p_{MSRP}}$$

The dealer's upfront price $p_u$ may be regarded as a guaranteed acceptable price or a guaranteed contract price.

Other price indices may be used in place of MSRP $p_{MSRP}$ in the denominator of the immediately preceding equations for computing the offered price ratio $R_p$ and the upfront price ratio $R_{p,u}$; for example: a baseline price selected by the dealership for a particular make, model, trim selection; an arbitrary or predetermined price selected by the dealer; a price associated with a dealer's cost; a price associated with the dealer invoice price; a price associated with the dealer invoice price less dealer holdback; a price associated with a dealer's true cost; a price reflecting one or more secondary market transactions; an average market price, an average internet price or another price index.

If any of the preceding price indices are utilized in place of MSRP $p_{MSRP}$, then the nomenclature for the corresponding price ratio may change. For example, if a dealer's true cost $p_{tc}$ were used, then the corresponding dealer's alternative upfront price ratio $\tilde{R}_{p,u}$ would be computed as $$\tilde{R}_{p,u} = \frac{p_u}{p_{tc}}$$

and me corresponding alternative offered price ratio would be computed as $$\tilde{R}_p = \frac{p}{p_{tc}}.$$

The following expression defines the probability that an automobile purchase transaction will be consummated for all offered price ratios $R_p$ that are greater than or equal to the dealer's upfront price ratio $R_{p,u}$:

$$\hat{P}(p \geq p^*) = 1, \forall R_p \geq R_{p,u}$$

where $\hat{P}(p \geq p^*)$ represents the probability $\hat{P}$ that an offered price p (e.g., corresponding to a buyer's offer) greater than or equal to an acceptable price p* (e.g., corresponding to a dealer's minimum acceptable price) will be accepted. The probability $\hat{P}$ will be equal to 1 (i.e., a 100% probability) for all offered price ratios $R_p$ that are greater than or equal to the dealer's upfront price ratio $R_{p,u}$. The upfront price ratio $R_{p,u}$ may also be more generally regarded as the acceptance threshold price ratio when it is computed from a price other than a dealer's upfront price.

In the case of offered price ratios $R_p$ that are less than the dealer's upfront price ratio $R_{p,u}$, let $\tilde{R}_p$ correspond to a dealer's price ratio that is based on some other price metric other than the upfront price $p_u$; that is to say $\tilde{R}_p$ will correspond to some other price ratio evaluation metric that the dealer might use when or if the dealer is not able to consummate a transaction for the purchase of an automobile using the upfront price $p_u$ alone to determine a minimum threshold criterion for accepting a buyer's offer.

The following expression defines the probability that an automobile purchase transaction will be consummated for all offered price ratios $R_p$ that are less than the dealer's alternative price ratio $\tilde{R}_p$:

$$\hat{P}(p \geq p^*) = P(R_p \geq \tilde{R}_p) \forall R_p < R_{p,u}$$

where, again, $\hat{P}(p \geq p^*)$ represents the probability $\hat{P}$ that an offered price p (corresponding to a buyer's offer) greater than or equal to an acceptable price p* (corresponding to a seller's/dealer's minimum acceptable price) will be accepted. The probability $\hat{P}$ will be equal to $P(R_p \geq \tilde{R}_p)$ (i.e., how often the offered price ratio $R_p$ meets or exceeds the alternative minimum threshold criterion price ratio $\tilde{R}_p$) for all offered price ratios $R_p$ (i.e., the price ratio computed from the buyer's offered price p) that are less than the dealer's upfront price ratio $R_{p,u}$ (i.e., the price ratio computed from the dealer's upfront price $p_u$).

In another embodiment, a local area probability may be computed in accordance with:

$$\hat{P}(p \geq p^*) = \frac{1}{n} \sum_{j=1}^{n} \hat{P}_j(p \geq p^*)$$

which is to say that a plurality of n probabilities $\hat{P}_j(p \geq p^*)$ may be averaged to produce an average probability for a particular geographic area.

With these relationships defined, a logistic regression model comprising a set of rules may be formulated for numerical analysis and optimization as implemented on a computing device or system in accordance with the following:

$$\hat{P}(p \geq p^*) = \frac{1}{1 + e^{-\theta_{i,t,s}}}$$

where, again, $\hat{P}(p \geq p^*)$ represents the probability P that an offered price p (corresponding to a buyer's offer) greater than or equal to an acceptable price p* (corresponding to a dealer's minimum acceptable price) will be accepted.

The right-hand side of the immediately preceding equation represents a generalized form for constructing embodiments of a logistical regression for the likelihood model 442. Additional information associated with logistical regression modeling can be found in Neter, Kutner, Nachtsheim, and Wasserman (1996), Applied Linear Statistical Models, Boston: McGraw-Hill, which is incorporated by reference herein.

The explanatory variable $\theta_{i,t,S}$ may be a series expanded as a linear combination of explanatory variables $X_{i,t,n}$ and parameters $\beta_n$ (appearing as linear coefficients of explanatory variables $X_{i,t,n}$) in accordance with the following:

$$\theta_{i,t,S} = \beta_0 + \beta_1 X_{i,t,1} + \beta_2 X_{i,t,2} + \beta_3 X_{i,t,3} + \beta_4 X_{i,t,4} + \beta_5 X_{i,t,5} + \varepsilon_{i,t,S}$$

where:

$X_{i,t,1}$ represents the supply for a similar vehicle of vehicle bin i at time t;

$X_{i,t,2}$ represents the existing demand of a similar vehicle of vehicle bin i at time t;

$X_{i,t,3}$ represents the dealer lot residence time of a similar vehicle of vehicle bin i at time t;

$X_{i,t,4}$ represents the days until the end of the incentive period of a similar vehicle of vehicle bin i at time t; and $X_{i,t,5}$ represents the ratio of the existing demand to the supply plus 1, or $$\frac{X_{i,t,2}}{(X_{i,t,2} + 1)},$$

of a similar vehicle of vehicle bin i at time t.

Population of, e.g., a dealer's historical price ratio data into the above logistic regression model may proceed with subsequent optimization of the parameters $\beta_n$ to tune the model to conform to the populated historical data. In a representative embodiment, such conformational correspondence may be achieved (or otherwise approximated) via, e.g., minimization of the ordinary least squares difference as between historical price ratio data and variation of the coefficients of the logistic function. Any numerical optimization method, whether now known or hereafter derived in the art, may be alternatively, conjunctively or sequentially employed to achieve a substantially similar result. See, for example, Numerical Recipes: The Art of Scientific Computing, Third Edition (2007), 1256 pp., Cambridge University Press, ISBN-10: 05218806889, which is incorporated by reference herein. For large data sets, optimization may proceed by a directional derivative and/or gradient approach to accelerate conformational convergence of the logistic function to the historical data.

As will be understood by persons skilled in the art, $\beta_0$ is the intercept of the linear regression equation (i.e., the value of the criterion when the predictor is equal to zero), and $\varepsilon_{i,t,S}$ represents the standard error term commonly associated with logistic regression modeling. Other implementations associated with various other representative embodiments may be suitably adapted to determine whether a buyer's offer would be accepted by a local dealer for a virtual vehicle of the local dealer (e.g., a vehicle not currently on the dealer's lot). Still other implementations in accordance with various other representative embodiments may be suitably adapted to determine whether a buyer's offer would be accepted by a dealer for a specific VIN at the dealership.

Referring now to low volume model 444, this model may be trained such that if there are not enough transactions in the highest level bin of data associated with a year, make, model or segment of a vehicle, this low volume model 444 may be utilized to determine likelihoods for that vehicle. Such a low volume model 444 may determine binned averages at an even higher level, increasing that amount of pricing data available for training in cases with extraordinarily low sales volume. In particular, the low volume model 444 will be configured to calculate the binned averages at larger structural bins, such as year-make or make levels. In one embodiment, the actual algorithm applied for low volume model 444 will be the same as that for predictive model 442 with the only change being that the model parameters in the equation for predictive model 442 will be trained using such an expanded data set. Low volumes may be better understood with reference to U.S. Pat. No. 8,612,314 entitled "System and Method for the Utilization of Pricing Models in the Aggregation, Analysis, Presentation and Monetization of Pricing Data for Vehicles and Other Commodities" by inventors Swinson et al, issued on Dec. 17, 2013 and hereby incorporated by reference in its entirety for all purposes.

It will be noted here, that the steps of FIG. 4A may be performed by a vehicle data system in a back-end process to obtain data from various data sources, bin this data at various levels and generate a set of rules for the likelihood model 442 or low volume model 444 for these bins of vehicle data, among other tasks. As discussed these determinations may entail a huge (e.g., on the order of $10^9$ or greater) number of determinations or calculations and it may be prohibitive to accomplish such determinations in real-time. However, much of the data or models obtained or determined in this back-end process may be accessed in a real-time front end process. Accordingly, the obtained or determined data (e.g., the data bins) and the components of the likelihood model 442 or low cost model 444 may be stored, sorted or indexed in the data store of the vehicle data system so as to allow real-time lookup, as well as rapid updates during model updates (which may occur on some time frame such as daily, weekly, etc.). For example, in one embodiment, daily PRs for each bin may be indexed by a unique bin identifier (e.g., a string containing trim group, location, and model year), with the individual PRs stored in a dequeue (i.e., double ended queue) for efficient retrieval and update. Exogenous parameters and model parameters may be indexed in a similar way (e.g., a string containing model, dealer id, and date string, with one parameter per column). In this manner, the stored data and parameters may be accessed quickly, in real-time, using a vehicle configuration specified by a user in a front-end process.

With that in mind, FIG. 4B depicts one embodiment of a front-end process that may be performed by a vehicle data system utilizing the models or data determined in a back-end process. Initially, at step 450 the vehicle data system may receive a specific vehicle configuration 452 through a provided interface and a vehicle price offered 454 by the user. In one embodiment, for example, a user at a web page provided by the vehicle data system may select a particular vehicle configuration using one or more menus or may navigate through a set of web pages to provide the specific vehicle configuration 452. The user may also specify a geographic locale where he is located or where he intends to purchase a vehicle of the provided specification.

At step 455, the vehicle data system may receive selections as to one or more dates of interest and for which a likelihood distribution for a selected vehicle is sought. In one embodiment, a user may select one or more dates on a pull-down calendar or slider presented on the provided interface. Alternatively, in other embodiments, the interface may also suggest or visually present predetermined or pre-calculated date ranges during which a likelihood may be favorable or unfavorable to a user. Such dates may be determined based on statistical information determined from the data set corresponding to the specified vehicle. In certain embodiments, the user may not be prompted to select one or more dates of interest and the current date or time frame (e.g., next week, two weeks, month, etc.) may be used by the vehicle data system.

Once the user's geographic locale is received, at step 457 a set of dealers may be selected. In one embodiment, the set of dealers may a number of dealers that are geographically closest to the user, that offer an upfront price for the specified vehicle of interest or a vehicle similar to the specified vehicle of interest, and has completed one or more transactions for a vehicle similar to the specified vehicle. These dealers may be members of particular network of dealers (e.g., TrueCar dealer network). In a particular embodiment, the set of dealers (e.g., within a geographic area of the user) may be selected according to a set of dealer selection rules. These dealer selection rules may include one or more dealer scoring rules (also referred to as a dealer scoring algorithm or DSA). The dealers are scored according to these rules using one or more criteria. The dealer scores associated with the dealers that are within the geographic area of the user may be used to select a set of dealers (e.g., the top three or top five with the highest (or lowest) scores). Embodiments of such dealer scoring is discussed in U.S. Pat. No. 8,868,480, issued on Oct. 21, 2014 to McBride et al and U.S. Pat. No. 8,589,250, issued on Nov. 19, 2013 to Noy et al, which are hereby incorporated herein by reference for all purposes.

Data associated with the specified vehicle configuration which was provided by the user may then be determined by the vehicle data system at step 460. This data may be dealer data 466 including both historical transaction data associated with the specified vehicle of interest for the selected set of dealers and current data associated with the selected set of dealers, including upfront pricing data, demand data or supply data (e.g., inventory levels). In a particular embodiment, the data selected may be associated with the selected set of dealers (as determined at step 457) such that only data associated with those dealers may be utilized. A determination may be made if an amount of the data from the selected set of dealers is sufficient and if not, an additional dealer may be added to the set of dealers based on the scores of the dealers (e.g., as determined at step 457). For example, if the three highest scoring dealers are selected (e.g., in step 457) but the data from these three dealers is deemed insufficient an additional dealer (e.g., the fourth highest scoring dealer) may be added to the set of dealers. In this manner, the set of dealers can be iteratively expanded until a sufficient amount of data can be obtained.

In other embodiments, data may be selected based on a set of bins forming a hierarchy from most specific to least specific, with each bin associated with a geography (e.g., DMA, state, region, national, etc.), a time ($N_{hist}$), or a structure (e.g., a vehicle definition defined by a trim level, a year, a make, a model or a vehicle segment). It is usually the case then, that data in a less specific bin will be a superset of data in a more specific bin. Fallback logic 462 may be configured to implement a set of rules to select the most specific of the set of bins that has a desired sample size of data. The order of the bins (e.g., the ordering from most specific to least specific) may be data-driven and selected to minimize trim group-volume weighted errors. Thus, fallback binning logic or rules 462 will first test the sufficiency of the data (e.g., transactions) within the smallest or most specific bin. If the mean number of transactions per day $N_{trans}(t)$ is insufficient, or too many days have $N_{trans}$ below a critical value, then the next most specific bin may be evaluated to determine the sufficiency of data. As an example, a mean $N_{trans}$ of 5 and no more than 5% of days in $N_{hist}$ have 2 or fewer transactions may be a test for data sufficiency for a bin. If either of these conditions is violated, fallback rules 462 may retest data sufficiency at the next highest bin.

Specifically, in one embodiment, the vehicle data system may utilize a fallback binning rules 462 to select a data set that has a proper sampling size to provide, where possible, national, local, upfront price based or transaction based likelihood determinations for the vehicle having the trim, geography and other attributes specified via the user interface. In some embodiments, the selection of a fallback binning logic is based upon a categorization of the historical data into separate tranches, or bins, designed to capture sample sets of increasingly larger extents. These bins may have been predetermined and stored at the vehicle data system in a back-end process as discussed above.

As an example, a first bin might contain all transactions involving the exact same trim group of the selected vehicle in the dealer market area (DMA) of the user's selection within the last sixty days. If this first bin contains an adequate sample size to implement a likelihood model 442, then this data bin is used. If not, a more general bin, comprising, for example, all sales of vehicles having belonging to the same year, make and model as the selected vehicle, over a larger geographic region, such as an entire state, will be tested. If this second bin contains a sample size sufficient to implement a likelihood model 442, the data in this bin is selected. If not, a determination is made as to whether the next most general data bin provides an adequate sample size. In the event that fallback rules 462 are unable to determine that the most broadly defined (e.g., least specific) data bin of the set of bins contains an adequate sample size, the vehicle data system determines a suitable data set using a low volume model 444 as discussed.

Embodiments may be configured to determine a pricing likelihood for the selected vehicle at step 465 based on the data in the bin and a stored likelihood model 442. Alternatively, where the vehicle data system has not been able to find sufficient data for a set of dealers of for a set of bins using fallback binning logic (e.g., for low volume vehicles) likelihoods may be determined based upon low volume model 444.

In particular, using the historical transaction data, current data for the set of dealers (e.g., inventory or upfront pricing data) and the likelihood model the probability $\hat{P}$ that an offered price p (corresponding to the user's offer) greater than or equal to an acceptable price p* (corresponding to a dealer's minimum acceptable price) will be accepted may be determined given a current set of parameters associated with a similar vehicle to the user specified vehicle configuration as determined from the data associated with the determined set of dealers or bin including, for example, the current supply for a similar vehicle, the existing demand of a similar vehicle, the dealer lot residence time of a similar vehicle, the days until the end of the incentive period of a similar vehicle; and the ratio of the existing demand to the supply plus 1, or $$\frac{X_{i,t,2}}{(X_{i,t,2}+1)},$$

of a similar vehicle. This likelihood may be, for example, a cumulative distribution function for the historical transactions data associated with the set of dealers and in particular may be associated with the standard deviations of those historical transactions from an average price of the specified vehicle.

Based on the determined likelihood an interface for the presentation of the likelihood of a dealer accepting the user provided offered price may be generated at step 470. The interface generated may be determined in accordance with a user request received at the vehicle data system based on a user's interaction with other interfaces provided by the vehicle data system. In this manner, a user may "navigate" through the interfaces provided by the likelihood determination portion of the vehicle data system to obtain a likelihood prediction and desired data about a specified vehicle configuration.

Figure 5:
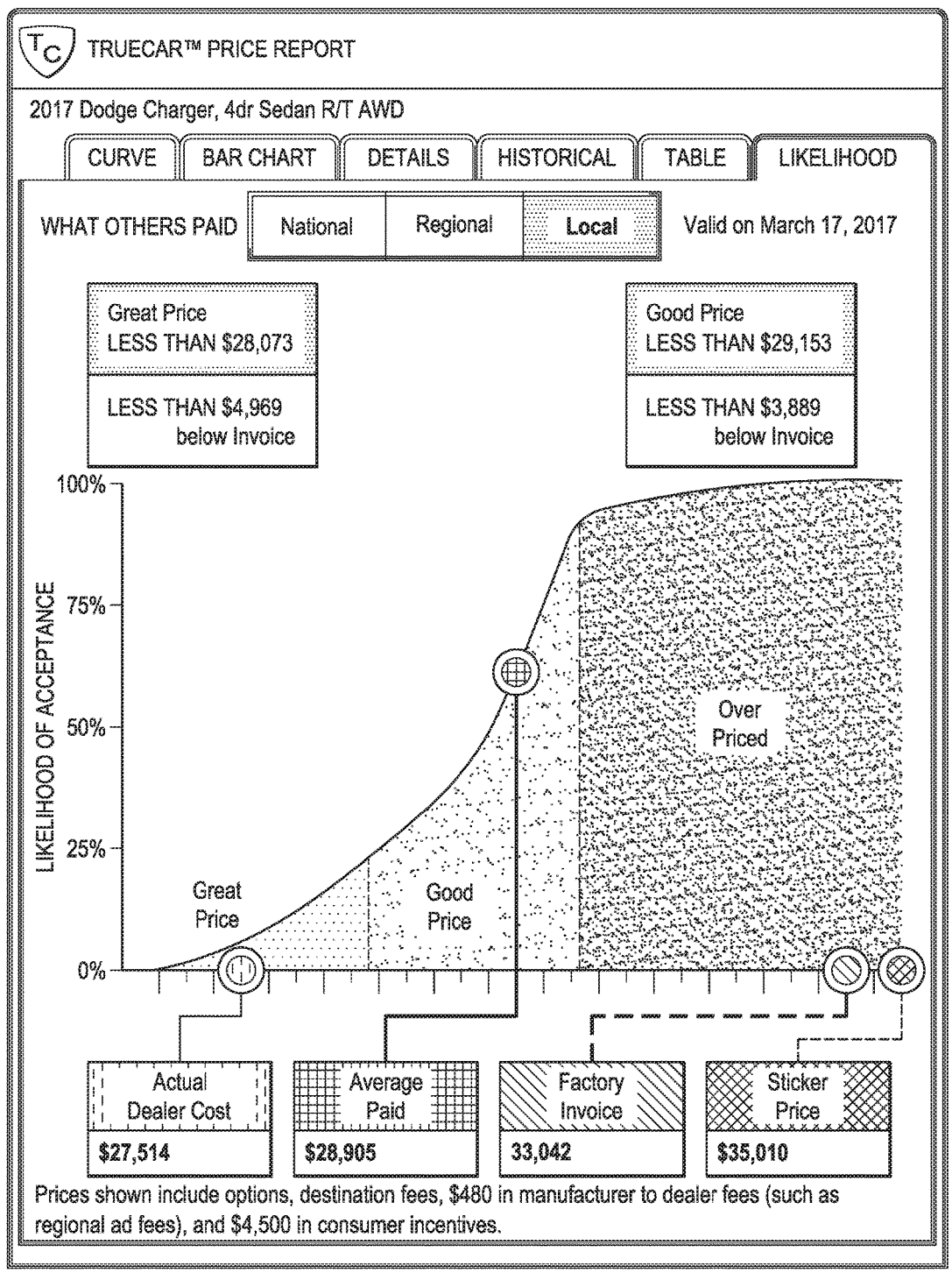
FIG. 5 depicts one embodiment of an interface for presenting a likelihood distribution for a vehicle.

These interfaces may serve to communicate the likelihood prediction and possibly other data in a variety of visual formats, including streamlined normal or cumulative distributions and pricing recommendations based on one or more data sets. In some embodiments, a likelihood distribution may be presented as a probability curve interface 472, with price values on the x-axis, and the predicted likelihood relative to the user's specified offered price on the y-axis. One example of such an interface is depicted in FIG. 5.

The generated interfaces can be distributed through a variety of channels at step 480. It will be apparent that in many cases the channel through which an interface is distributed may be the channel through which a user initially interacted with the vehicle data system (for example, the channel through which the interface which allowed the user to specify a vehicle was distributed). However, it may also be possible to distribute these interfaces through different data channels as well. Thus, interfaces which present data sets and the results of the processing of these data sets may be accessed or displayed using multiple interfaces and will be distributed through multiple channels, enabling users to access desired data in multiple formats through multiple channels utilizing multiple types of devices. These distribution methods may include but are not limited to: consumer and dealer facing Internet-based applications 482.

For example, the user may be able access an address on the World Wide Web (for example, www.truecar.com) through a browser and enter specific vehicle and geographic information and a desired offer price via its web tools. Data pertaining to the specific vehicle and geographic information may then be displayed to the user by presenting an interface at the user's browser. Data and online tools for the access or manipulation of such data may also be distributed to other automotive related websites and social networking tools throughout the web. These Internet-based applications may also include, for example, widgets which may be embedded in web sites provided by a third party to allow access to some, or all, of the functionality of the vehicle data system through the widget at the third party web site. Other Internet-based applications may include applications that are accessible through one or more social networking or media sites such as Facebook or Twitter, or that are accessible through one or more APIs or Web Services.

A user may also use messaging channels 484 to message a specific vehicle's configuration, desired price or time frame to the vehicle data system (for example, using a text, picture or voice message). The vehicle data system will respond with a message that includes a likelihood distribution (for example, a text, picture or voice message). Furthermore, in certain embodiments, the geographical locale used to determine the presented pricing information may be based on the area code of a number used by a user to submit a message or the location of a user's computing device. In certain cases, if no geographical locale can be determined, one may be asked for, or a forecast based on national historical sales data may be presented.

In one embodiment, a user may be able to use phone based applications 486 to call the vehicle data system and use voice commands to provide a specific vehicle configuration or desired offer price. Based on information given, the vehicle data system will be able to verbally present a likelihood of acceptance to the user. Geography may be based on the area code of the user. If an area code cannot be determined, a user may be asked to verify their location by dictating their zip code or other information. It will be noted that such phone based applications 486 may be automated in nature, or may involve a live operator communicating directly with a user, where the live operator may be utilizing interfaces provided by the vehicle data system.

While some embodiments of a DSA are illustrated in U.S. Pat. No. 8,868,480, issued on Oct. 21, 2014 to McBride et al and U.S. Pat. No. 8,589,250, issued on Nov. 19, 2013 to Noy et al, which are hereby incorporated herein by reference for all purposes, it will be useful here to go into more details about how one such embodiment of a DSA for use in embodiments as disclosed may be implemented.

a. Data Description

1) DSA Data

Based on, for example, data collected from September 2010 to April 2011, there are total of 82,994 non-mismatch sale and 18,296 mismatch sales. A mismatch sale is a sale from customer that did submit lead(s) but did not submit a lead to the sale dealer, either by choice or because the DSA did not choose to present that dealer. In one embodiment, mismatches are identified by comparing the dealer identification codes that were listed in the top 3 with the dealer identification code of the seller. If the selling dealer is not in the top 3, then a mismatch has occurred.

Since the historical dealer close rate and other dealer performance variables may be calculated using 45 days moving window. Only sales that happen after than Oct. 15, 2010 are included in the final model sample. 634,185 observations and 81,016 sales are used in the final model. Due to the lack of price offset information of mismatch sale dealer, we only include 4,263 mismatches (5.3%) out of 81,016 sales that price offsets are available in the final model. Non-mismatch is defined as those sale cases that happened to one of the three recommended dealers based on a DSA. Mismatch cases are defined as cases that happened to other dealers that were not recommended by a DSA in the top 3 places or those cases that sale dealer was displayed but no lead was generated.

A cohort can be a vendor (dealer) list in response to a single user query. An example of a cohort is a list of DSA candidate dealers who are available to sell the vehicle requested in a distinct user query. In one embodiment, three dealers within a cohort are selected for display to a user. In one embodiment, cohorts with leads less than 15 days old may also be excluded since the leads take time to convert into sales and those leads may be excluded to prevent underestimate the close rate of dealers.

2) Drive Distance Data

Drive distance and drive time of search ZIP to dealer location are obtained from a location service (e.g., mapquest.com, Google maps, etc.) and may be stored in association with the vehicle data system. In case of missing values; the drive distance and drive time value are imputed based on the average drive distance and great circle distance ratio for similar an nearby ZIP codes.

3) Dealer Inventory Data

Dealers' new car inventory information can obtained from data feeds provided by dealers as discussed above.

b. Features

In one embodiment, at least four types of features may be considered.

1) Features Describing the Individual Vendor ($X_{i,t}$)

Each dealer has certain special characteristic that may cause the user to prefer one over others. Those specific factors including dealer's price, available inventory, services and perks, historical performance, etc.

Price always plays a big role on sale in a competitive market. The price offset differ from the invoice price of the vehicle is considered as an important factor in the DSA model. In order to reduce the big price variance of different vehicles, the price offset as a percentage of invoice prices is used as the main price variable in the model. For those dealers that do not provide an upfront price or with excluding price, a program max value is used for their price offset. A program max value may be the upper bound for price offset set by a particular program. Once the upfront price for a dealer is larger than the program max, the program max may be used instead of the dealer's price. Furthermore, some dealers do not provide the price offset for certain trims; those cases are considered as excluding price. The program max is used when the dealer has excluding price.

In one embodiment, the DSA model incorporates dealers' overall new car inventory as a factor in the model because customers have indicated that vehicle unavailability is a big cause of mismatch sale or failing to close a sale. Customers may complain if they are not able to get the exact cars they want on the price certification when they go to the dealers. Therefore, the new car inventory value is introduced as a variable to measure the overall dealership size. It is reasonable to assume that a large dealership will have a higher probability to have the searched vehicle than a small dealership. Dealers who do not provide inventory information may be assigned average value of inventory in the candidates dealer list for each cohort.

Besides the vehicle itself, car buyers also consider the warranty, maintenance and other services during their decision making. A vehicle data system using embodiments of a DSA may display dealer's special services along with their upfront price and location in the search result. Therefore, whether the dealer provides special services is also considered as a potential factor. A "perks" dummy variable is defined as "1" if the dealer provides any one of the following service such as limited warranty, money back guarantee, free scheduled maintenance, quality inspection, delivery, free car wash, and "0" otherwise.

Probability of sale is also highly related to the historical performance of a dealer. Dealers with excellent sale persons and a good reputation should have higher close rates than others. Those factors are measures by their historical close rates. In one embodiment, a DSA model calculates the close rate for each dealer based on their performance in previous 45 days. 45 days may be chosen as the moving window because it is a medium length time window that will provide a dealer's historical performance but also can quickly reflect the changes of the overall vehicle market due to factors such as gas price change or new model release. See equation 1 below for details of calculation of dealer close rate. Since some dealers only take leads from those zips that locate 60 miles or closer. The close rate is only based on the sales and leads within 60 miles drive distance. When close rate is missing due to no sale or no leads in the past 45 days, designated market area (DMA) average or any other geographic boundary average close rate is used.

$$\text{Dealer close rate} = \frac{(\text{Count of sales in last 45 days})}{\begin{pmatrix} \text{Count of sales in last 15 days} + \\ \text{Count of leads in last 30 days} \end{pmatrix}} \quad \text{EQ. (1)}$$

In order to better predict the inventory status of a dealership and put more weight on dealer's most recent performance, one more variable "defending champion" may be added to the model as another type of performance measured variable. The defending champion assigns a higher weight on a recent sale than a sale that is far away. For instance, dealers will get more credits if they made a success sale yesterday than a sale that is 30 days ago. It is assumed that the dealers have recently made a sale for a make will have a higher chance to have similar cars in their inventory than dealers who have not made a sale for a certain time period.

The vehicle make is another dealer feature that might affect the determination. Different makes might have different probability function. In one embodiment of the DSA algorithm, for example, Mercedes-Benz dealers show a different pattern compared to other makes and the close rate for Mercedes-Benz dealers is relatively high compared to network dealers that sold other makes.

2) Features of Individual Vendor Compared to Other Vendors ($X_{i,t,s}$)

The absolute value of individual vendor's attributes may not reflect its advantage or competitiveness. Those features may be ascertained through a comparison to other vendors. Therefore, vendor features relative to other competitors are important factors in predicting the probability of sale in our algorithm.

In one embodiment of the DSA algorithm, most of the individual dealer features such as drive time, price offset; historical close rate, inventory and defending champion are all rescaled among all the candidate dealers within each cohort. Individual dealer's historical dealer close rate, new car inventory are rescaled using the following equation $$x_i = \frac{\left(x_i - \min_i x\right)}{\left(\max_i x - \min_i x\right)}$$

Drive time, defending champion, price are rescaled using a different equation:

$$x_i = 1 - \frac{\left(x_i - \min_i x\right)}{\left(\max_i x - \min_i x\right)}$$

All the rescaled variables can range from 0 to 1. Different equation may be used when rescaling the variables because it may be desired to get value 1 to the best dealers for all the dealer features. For example, the dealer with highest historical close rate can get a rescaled close rate 1 and the dealer with lowest close rate can get a value of 0. Similarly, the dealer with the minimum drive time can get a value of 1 and the dealer with maximum drive time can get a value of 0.

Dummy variables indicate best price, closest dealers are included as well to compare the dealer's price and distance relative to others. Additional variable(s) to measure the absolute difference of price and drive time may be constructed to adjust their effects on sale for those cases that the maximum and minimum values do not significantly differ.

Network dealer density is another factor related to dealer i (a type of vendor) itself and other dealer close to dealer j. Each dealer needs to compete with others in a high dealer density area and will be dominant in a low dealer density area. In one embodiment, this make and dealer density interaction may only be accounted for at the same make level. However, it is possible that the dealer with similar makes (e.g. Nissan and Honda) will be competitors as well.

3) Features Describing Individual Customer ($Y_{c,t}$)

The demographic features of individual customer may result in different interests on products and buying the same products from different vendors. Those factors can include income, family size, net worth, gender, historical purchase behavior, etc. Those user data can be obtained from public data source such as U.S. census data or online user database for different industries.

In one embodiment of a DSA, searched vehicle make and customer local dealer density are included in predicting the probability of buying (Pb) for a particular cohort. Customers' choice of vehicle make is a potential indicator of customer's income, family size. It is highly possible that people purchasing luxury cars are less sensitive to price and more sensitive to drive time. In this case, the DSA algorithm can put more weight on distance when the customer comes from a high income ZIP code to increase the probability of closing (Pc). It may also be assumed that price is more important on sale for customer located in a large city with high dealer density while distance is more important for people in rural area with only 2 dealerships available within 200 miles. Count of available dealers within certain drive time radius is used as customer local dealer density variable. Dummy variable for each make are included in the model selection process using statistical software (SAS Proc logistic, for example), three out of 35 makes (Mercedes-Benz, Mazda, Volkswagen) result in significant p-values for their dummy variables, which indicates that those three makes have different sales probability compared to other makes. Further, make and dealer density interaction terms are tested as well and the interaction between Mercedes-Benz and dealer density remain significant. So those factors may also be included in embodiment of a DSA model. Although the make and network features may not affect the dealer ranks within each cohort since each cohort will have the same make and density information for different candidate dealers, those factors will affect the expected revenue (for example, for each dealer or of an entity getting paid by dealers for leads such as TrueCar) that those three makes have different function of probability of sale compared to other makes.

Besides the demographic features, customer's historical buying preferences may also influence one's purchasing behavior. Those types of factors are frequency and volume of transactions, the price level category (low, medium high) in which their transactions fall, previous purchase history, etc. It is possible a customer brought a 2-door Mini Cooper before might want to buy a 4 door car that might be used in different circumstance. Therefore, previous purchase choice of make, vehicle body type will be indicators of next purchase as well.

4) Features Describing the Interactions of a Particular Customer and a Particular Vendor ($Y_{c,i}$)

In terms of car purchase, distance is one of the most important interaction terms between customer and dealers which influence buyers' decision. This is also true for other large products similar as vehicles. In one embodiment, great circle distance of a dealer may be considered. However, there are certain areas with islands and lakes (such as: Great Lakes or Long Beach, N.Y.) that drive distance would be a better indicator of distance compared to great circle distance. Drive time may also be used in embodiments of a DSA model because the same drive distance in different locations might relate to different drive time. For example, 60 miles in a rural area might be related to a 1 hour drive but 2 hours or even more in a big city. Therefore, drive time would be a variable that can be equalized to people in different locations.

Five drive distance derived dummy variables which indicate if the dealer is located in a certain distance range are developed in order to capture the sale and distance relationship for certain special cases. It is possible that the drive time for the closest dealer and furthest dealer do not differ too much. In those cases, those variables will adjust the weights on minimum drive time so that we do not overestimate the effect of minimum drive time on sale.

In addition, dealer location is also important to sale when the customer is located in the border of two states. Due to the different rules on vehicle regulation and registration, people might tend to go to a dealer locates in the same state as where they live. "Same State" dummy variable is therefore include in our model to indicate if the customer and dealer are located in the same state.

In certain cases, certain dealers have outstanding performance in certain ZIP code areas compared to their average performance across all the ZIP codes. This might be due to some customer population characteristics in certain ZIP code. For example, a ZIP code with high density of immigrants whose first language is not English might go to a dealership with sale persons that can speak their first language or have a dealer website with their first language. Therefore, a variable measure dealer's performance in specific ZIP code is also included in embodiment of the DSA model. It is defined as the number of sale in a specific customer search ZIP in the past 45 days.

In addition, it is also possible that customer might go to the same dealer if they bought a car from this dealer before. The customer loyalty effect might be even more pronounced in some other industries which provide services rather than actually products. This can be one of the most important factors for predict the probability of buying for a particular customer from a certain vendor.

Operationally, embodiments of a DSA would use the estimated model by feeding in the values of the independent variables into the model, computing the probabilities for each candidate dealer in a set s, and present the dealers with the top probabilities of closing to customer c.

Below is a non-exclusive list of variables that could be utilized in a DSA model:
Proximity
Dealer Close Rate
Price
Selection
Dealer Perks/Benefits
Customer Household Attributes
Additional Customer Attributes
   Credit Score
   Garage Data (current owner of same brand of vehicle, etc.)
Additional Dealer Attributes
   Profile Completeness
   Dealer Rating
   Customer Satisfaction Rating
   Dealer Payment History
Transaction Attributes
   Transaction type (e.g., Lease, Cash, Finance)

Trade-In (i.e., whether a trade-in vehicle is involved)

As an example, a DSA may consider all dealers, (i=1, ... K) selling the same trim (t=1, ..., T) to users in ZIP Code z (z=1, ..., ZL) located in the same locality L (z ∈ L if the drive time distance from the customer's search ZIP code center to dealer location ≤3 hours). The model uses a logistic regression based on the combined data of inventory, DSA historical data, drive distance, and dealer perks.

$$P_c = f(P_s, P_b) = \frac{1}{1 + e^{-(\theta_{i,t,S} + \delta_{c,t,i})}}$$

where $\theta_{i,t,S} = \beta_0$

{Features of Individual Dealers, i}
$+\beta_1 \times$dealer's price within each cohort
$+\beta_2 \times$dealer's inventory within each cohort
$+\beta_3 \times$dealer's perks
$+\beta_4 \times$dealer's historical close rate
$+\beta_5 \times$dealer's defending champion
$+\beta_6 \times$the make of trim t sold by dealer i is Mercedes-Benz
$+\beta_7 \times$the likelihood of payment by dealer i to a parent company
$+\beta_8 \times$if dealer i has completed a profile
$+\beta_9 \times$dealer is rating
$+\beta_{10} \times$dealer is customer satisfaction {Features Relative to Other Candidate Dealers, i,S}
$+\beta_{11} \times$Mercedes-Benz make and density interaction
$+\beta_{12} \times$Mazda make and density interaction
$+\beta_{13} \times$Volkswagen make and density interaction
$+\beta_{14} \times$if dealer has the minimum drive time
$+\beta_{15} \times$if dealer has lowest price within each cohort
$+\beta_{16} \times$difference between the dealer's price and maximum price offset in percentage of invoice
$+\beta_{17} \times$difference between the dealer's drive time and minimum drive time dealer $\delta_{c,t,i} = \alpha_0$ {Features of Individual Customer, c}
$+\alpha_1 \times$the household income of customer c
$+\alpha_2 \times$the family size of customer c
$+\alpha_3 \times$customer c's household size
$+\alpha_4 \times$count of dealers within 30 min drive
$+\alpha_5 \times$count of dealers within 1 hour drive
$+\alpha_6 \times$count of dealers within 2 hours drive
$+\alpha_7 \times$if customer c bought this type, or this make before
$+\alpha_8 \times$customer c's credit score
$+\alpha_9 \times$customer c's garage data (if customer c is a current owner of same brand of vehicle, etc.)
$+\alpha_{10} \times$transaction type (lease, cash, finance, etc.)
$+\alpha_{11} \times$is a trade in associated with the potential purchase {Features Describing the Interaction of Customer c and Dealer i}
$+\alpha_{12} \times$drive time from customer c to dealer i
$+\alpha_{13} \times$if customer c bought from dealer i before
$+\alpha_{14} \times$dealer is number of sales in customer c's ZIP code
$+\alpha_{15} \times$if dealer i is within 10 miles of customer c
$+\alpha_{16} \times$if dealer i is within 10-30 miles of customer c
$+\alpha_{17} \times$if dealer i is within 30-60 miles of customer c
$+\alpha_{18} \times$if dealer i is within 60-100 miles of customer c
$+\alpha_{19} \times$if dealer i is within 100-250 miles of customer c
$+\alpha_{20} \times$if dealer i is in the same state as customer c
$+\varepsilon_{c,t,i}$ Although each of the above factors may be vital for determining the probability of closing a sale (Pc), embodiments do not require each factor to be present in a DSA. For example, in an embodiment the DSA may include the following features of an individual dealer a dealer's price within each cohort ($\bar{\ }1$), dealer's inventory within each cohort ($\_2$), dealer's historical close rate ($\_4$) and drive time from customer c to dealer i ($\bar{\ }12$) which is a feature describing an interaction of customer c and dealer i.

Although the dealer rank may not change if customer features and customer historical preference variables are excluded from the DSA, it may still be decided to include them in embodiments of the DSA model because the overall probability of closing will be different for different makes. This probability may be applied to calculate the each dealer's expected revenue and that number will be affect by the choice of make and customer local dealer density.

A non-limiting example for determining Pc and selecting a set of dealers i for presentation to an interested consumer c will now be described with these example parameters: search zip="01748" Hopkinton, Mass., Make="Toyota", Trim_id="252006", Trim="2012 Toyota RAV4 FWD 4dr I4 sport".

TABLE 1

| Parameter | Label | Estimate | Std | Pr > ChiSq | Odds Ratio |
|---|---|---|---|---|---|
| Intercept |  | −6.838 | 0.058 | <.0001 |  |
| Distance |  |  |  |  |  |
| DD10 | If dealer is within 10 miles | 2.934 | 0.035 | <.0001 | 18.802 |
| DD30 | If dealer is within 10-30 miles | 2.366 | 0.031 | <.0001 | 10.657 |
| DD60 | If dealer is within 30-60 miles | 1.572 | 0.029 | <.0001 | 4.817 |
| DD100 | If dealer is within 60-100 miles | 0.937 | 0.028 | <.0001 | 2.552 |
| DD150 | If dealer is within 100-150 miles | 0.347 | 0.029 | <.0001 | 1.414 |
| DD250 | if dealer is with 150-250 miles | Reference |  |  |  |
| min_DT_I | If dealer has min drive time | 1.029 | 0.014 | <.0001 | 2.798 |
| r_DT | Rescaled drive time | 3.642 | 0.065 | <.0001 | 38.148 |
| DT_diff | Difference between the Max drive time | −0.13 | 0.005 | <.0001 | 0.878 |

TABLE 1-continued

| Parameter | Label | Estimate | Std | Pr > ChiSq | Odds Ratio |
|---|---|---|---|---|---|
| Price | | | | | |
| min_price_I | If dealer has lowest price | 0.31 | 0.015 | <.0001 | 1.363 |
| pct_offset_diff | Difference between the max percent price offset of invoice | 7.819 | 0.258 | <.0001 | >999.999 |
| r_price | Rescaled Price | 2.247 | 0.063 | <.0001 | 9.456 |
| DT_Price | Price, drive time interaction | −1.556 | 0.066 | <.0001 | 0.211 |
| Dealer Attributes | | | | | |
| r_inventory | Rescaled new car inventory | 0.176 | 0.017 | <.0001 | 1.192 |
| perks | If dealer provide special service | 0.065 | 0.011 | <.0001 | 1.068 |
| r_defending_champ | Rescaled Defending Champing | 0.508 | 0.016 | <.0001 | 1.662 |
| r_zip_sale | Rescaled number of sale in requested zip code | 0.287 | 0.014 | <.0001 | 1.333 |
| r_CR | Rescaled historical close rate | 0.196 | 0.016 | <.0001 | 1.217 |
| same_state | If dealer is in the same sate | 0.318 | 0.014 | <.0001 | 1.374 |
| make_id27 | Mercedes-Benz | 1.794 | 0.189 | <.0001 | 6.014 |
| make_id27_d | Mercedes, Dealer Density interaction | −0.755 | 0.082 | <.0001 | 0.47 |
| make_id26_d | Mazda, Dealer Density interaction | −0.033 | 0.01 | 0.0007 | 0.967 |
| make_id40_d | Volkswagen, Dealer Density interaction | 0.015 | 0.005 | 0.0039 | 1.015 |
| Network Attributes | | | | | |
| dealer_cnt_30 | Count of Zag dealers within 30 min drive | −0.132 | 0.005 | <.0001 | 0.877 |
| dealer_cnt_60 | Count of Zag dealers within 1 hour drive | −0.096 | 0.004 | <.0001 | 0.908 |
| dealer_cnt_120 | Count of Zag dealers within 2 hous drive | −0.12 | 0.003 | <.0001 | 0.887 |

As Table 1 exemplifies, weightings or coefficients can be associated with features utilized in a DSA model. For example, if a dealer i is closer to the consumer c (e.g., driving distance or DD is small), then that dealer i will have a higher coefficient than another dealer that is further from the consumer c. More so, features with a "_i" may be bimodal attributes where the attribute is either added to the DSA or not. Rescaled features may be the rescaled variables as previously described. Std represents the standard deviation of a coefficient, Pr>ChiSq may represent if an attribute is important, and the odds ratio represents a relative significance of an attribute. Network attributes may represent the competition or number of other networked dealers within a geographical region. Using the above coefficients for attributes, a DSA model may determine Ps, Pb.

Table 2 below shows by example attributes for a set of dealers i (dealership_id) that are the closest to the consumer c and that sell a particular vehicle trim that the consumer c is interested in buying. In this non-limiting example, "gcd", "drive_time", and "drive_distance" may be raw data/attributes associated with a distance variable from a dealer i to the consumer c. For example, "gcd" may represent an aerial distance ("as the crow flies") from a dealer i to the consumer c, "drive_time" may represent the driving time distance in seconds from a dealer i to the consumer c, and "drive_distance" may represent the driving distance from a dealer i to the consumer c. "DD10", "r_DT", "Dt_diff" may represent computed attributes of variables for each dealer i within the set S. For example, "DD10" may represent a bimodal variable given if a dealer is within 10 miles of the consumer c, "r_DT" may represent a rescaled drive time relative to the other dealers in the set, and "Dt_diff" may represent a rescaled value between the maximum drive time distance of a dealer i within the set S and the consumer c.

TABLE 2

| | | | | Distance Variable | | | | | | | |
|---|---|---|---|---|---|---|---|---|---|---|---|
| dealership_id | gcd | drive_time | drive_distance | DD10 | DD30 | DD60 | DD100 | DD150 | min_DT_l | r_DT | DT_diff |
| 3730 | 6.11 | 621 | 10.74 | 0 | 1 | 0 | 0 | 0 | 1 | 1.00 | 0.53 |
| 6895 | 20.69 | 1560 | 28.40 | 0 | 1 | 0 | 0 | 0 | 0 | 0.51 | 0.27 |
| 7708 | 35.45 | 2193 | 49.37 | 0 | 0 | 1 | 0 | 0 | 0 | 0.18 | 0.10 |
| 8086 | 48.16 | 2537 | 64.17 | 0 | 0 | 0 | 1 | 0 | 0 | 0.00 | 0.00 |
| 8502 | 21.37 | 2054 | 34.36 | 0 | 0 | 1 | 0 | 0 | 0 | 0.25 | 0.13 |
| 9054 | 22.67 | 1315 | 28.79 | 0 | 1 | 0 | 0 | 0 | 0 | 0.64 | 0.34 |
| 9756 | 26.99 | 1925 | 44.44 | 0 | 0 | 1 | 0 | 0 | 0 | 0.32 | 0.17 |

Table 3 below represents attributes of the closet dealers i to consumer c. "Price_offset" represents a difference between a price a dealer i is selling a vehicle and an "invoice" price. Further, "Min_price_i" and "pct_offset_diff" represent computed attributes of variables for each dealer within the set. More specifically, "Min_price_i" is an attribute reflecting which dealer i within the set S has the lowest price, and "pct_offset_diff" represents a price percentage difference between the price the dealer i is selling the vehicle and the maximum price a dealer i within the set S is selling the vehicle.

TABLE 3

Price Variable

| dealership_id | price_offset | invoice | min_price_1 | pct_offset_diff | r_price | DT_Price |
|---|---|---|---|---|---|---|
| 3730 | $ 99 | $23,578 | 0 | 0.05 | 0.60 | 0.60 |
| 6895 | $1,200 | $23,578 | 0 | 0.00 | 0.00 | 0.00 |
| 7708 | −$400 | $23,578 | 0 | 0.07 | 0.87 | 0.16 |
| 8086 | −$649 | $23,578 | 1 | 0.08 | 1.00 | 0.00 |
| 8502 | $ 350 | $23,578 | 0 | 0.04 | 0.46 | 0.12 |
| 9054 | −$200 | $23,578 | 0 | 0.06 | 0.76 | 0.48 |
| 9756 | −$550 | $23,578 | 0 | 0.07 | 0.95 | 0.30 |

Table 4 below represent attributes associated with the particulars dealers in Table 3. Notice in this case, dealer "9054" is indicated as the "defending champion" in the set. Dealer "7708" is indicated as having a close rate of 1.00 and not in the same state with the consumer c.

TABLE 4

Dealer Attributes

| Dealership_id | inventory | r_inv | perks | r_defending_champ | sale_inzip_last_45days | r_zip_sale | close_rate | r_CR | same_state | make_id27 | make_id27_d | make_id26_d | make_id4_d |
|---|---|---|---|---|---|---|---|---|---|---|---|---|---|
| 3730 | | 0.5 | 0 | 0.72 | 0 | 1 | 0.08 | 0.00 | 1 | 0 | 0 | 0 | 0 |
| 6895 | | 0.5 | 1 | 0.25 | 0 | 1 | 0.23 | 1.00 | 1 | 0 | 0 | 0 | 0 |
| 7708 | | 0.5 | 0 | 0.23 | 0 | 1 | 1.00 | 0.20 | 0 | 0 | 0 | 0 | 0 |
| 8086 | | 0.5 | 1 | 0.39 | 0 | 1 | 0.10 | 0.16 | 1 | 0 | 0 | 0 | 0 |
| 8502 | 92 | 0 | 1 | 0.12 | 0 | 1 | 0.06 | 0.20 | 1 | 0 | 0 | 0 | 0 |
| 9054 | 309 | 1 | 0 | 1.00 | 0 | 1 | 0.15 | 0.48 | 1 | 0 | 0 | 0 | 0 |
| 9756 | | 0.5 | 0 | 0.82 | 0 | 1 | 0.09 | 0.07 | 1 | 0 | 0 | 0 | 0 |

Table 5 below represents an example of DSA ranking based on Pc which may be expressed as $$\frac{e^z}{e^z+1} = \frac{1}{1+e^{-z}}$$

where
z=−6.8384+DD10*2.934+DD30*2.3662+ DD60*1.5721+DD100*0.9368+DD150*0.3467+ min_DT_I*1.0288+min_price_I*0.3095+0.1758*r_inventory+0.0654*perks+3.6415*r_DT+ 0.5079*r_defending_champ+2.2467*r_price− 0.1204*dealer_cnt_120−1.5562*DT_Price+0.2872× r_zip_sale+0.3175×same_state+0.1961*r_CR− 0.1303*DT_diff+7.819*pct_offset_diff− 0.1316*dealer_cnt_30+1.7942×make_id27−0.0964× dealer_cnt_60−0.0332*make_id26_d− 0.7554*make_id27_d−0.0147*make_id40_d

TABLE 5

| dealership_id | $P_c$ | DSA Rank | Display |
|---|---|---|---|
| 3730 | 0.512 | 1 | Yes |
| 6895 | 0.030 | 4 | No |
| 7708 | 0.022 | 6 | No |
| 8086 | 0.025 | 5 | No |
| 8502 | 0.012 | 7 | No |
| 9054 | 0.212 | 2 | Yes |
| 9756 | 0.064 | 3 | Yes |

In this non-limiting example, dealers "3730", "9054", and "9756" from Table 4 are selected for presentation to the consumer c based on their DSA ranking. As one skilled in the art will appreciate, although dealership "8086" had the lowest price for the product, it may not be included in the highest ranking dealerships because of other attributes, such as distance to the customer.

In some embodiments, the potential revenue that a parent origination may receive as a result of a transaction between a dealer i and a consumer c may be taken into consideration. For example, suppose an expected revenue associated with dealer "9756" is substantially less than an expected revenue associated with dealer "6895", dealer "6895" may be selected for presentation to the consumer c, even though dealer "9756" has a higher DSA ranking than dealer "6895".

In some embodiments, an individual dealer's expected revenue ER can be calculated using the following:

$$ER = P_c \cdot R_g \cdot \theta_n$$

where ER represents an expected revenue from a lead, $P_c$ represents a probability of closing the sale, $R_g$ represents a gross revenue generated from a sale, and $\theta_n$ represents a net revenue adjustment. In one embodiment, gross revenue $R_g$ may be generated from a linear regression model. In various embodiments, gross revenue $R_g$ may be determined depending on a business model of a parent company, a multiplicative model, or any other type of model.

As a non-limiting example, gross revenue $R_g$ may be expressed as follows:

$$R_g = X\beta$$

where the $\beta$ coefficients are determined from the least-squares regression and the X matrix consists of variables chosen to isolate differences in estimated revenue.

Specifically, the revenue equation may be expressed as follows:

$$R_g = \beta_0$$

+$\beta_{1i}$×indicator for make of vehicle being purchased,
    $\forall i$, where i represents the vehicle make
+$\beta_2$×(if transaction type=Lease)
+$\beta_3$×(if transaction type=Finance)
+$\beta_4$×(if trade-in present)
+$\beta_5$×(indicator for new car)
+$\beta_{6k}$×(indicator for affinity partner)
    $\forall k$, where k represents the affinity partner In one embodiment, all gross revenues thus calculated are multiplied by their net payment ratio to account for differences in payment likelihood per dealership. To accomplish this, a separate multiplication factor, $\theta_n$, can be applied, where $\theta_n$ is to be estimated as the net payment ratio. Note that $\theta_n$ may be calculated based on a series of variables in a linear regression, or may be a simpler factor, such as a rolling 12-month window of payment history for the given dealer. For instance, for dealer Z, the total of the bills charged (by an intermediary entity such as a vehicle data system implementing an embodiment as disclosed herein) to dealer Z over the past 12 months might be $10000, but their total payments (due to charge backs and/or failure to pay, etc.) might have only been $7800. So, for dealer Z in this example, their net payment ratio would be $\theta_n = 0.78$.

These components can then be put together (e.g., by a DSA module of a vehicle data system) to obtain the expected revenue ER ($ER = P_c \cdot R_g \cdot \theta_n$) that the intermediary can anticipate by displaying a certain dealer to this particular consumer based on the customer's (lead) specific vehicle request.

Therefore, it is not only the consumer who might benefit from the DSA disclosed herein by reducing searching time and money but additionally an intermediary may also benefit. Furthermore, vendors can also benefit from the DSA disclosed herein. For example, a dealer can adjust their specific characteristic in order to increase close rate, better manage their inventory by reducing storage cost, and/or increase stock by avoiding potential loss of short of products.

In some embodiments of the DSA, each dealer's own expected revenue in local area L (within a 60 mi driving distance radius) can be computed using the following formula:

$$ER_{i,L} = \left[ \sum_{t=1}^{T} \sum_{s \geq t}^{T} \sigma_{t,s} n_{i,s} \pi_{i,s} \sum_{z=1}^{Z_L} P_{i,t,z} d_{t,z} \right]$$

where $d_{t,z}$ is the demand for trim t in ZIP Code z; $n_{i,t}$ is the inventory of trim t at dealer i; $\pi_{i,t}$ is the revenue per closed sale (which may be constant across all trims/dealer pairs or different), and $\sigma_{t,s}$ reflects the substitutability across trims. For example, if a user becomes a prospect for vehicle trim A, there is a possibility that he/she may actually buy vehicle trim B. The substitutability occurs when the buyer is presented with an onsite inventory that may differ from his/her online searches.

Independent variables that might influence the sale of a vehicle are included in the variable selection process. Price offset(s) are transformed to the percentage over the invoice price to let the price offset at same scale among different car makers. Dealer related features are rescaled within one cohort to reflect their effect compared to other dealers. Certain non-rescaled variables can also be included to avoid overestimating the best price or closest dealer effect on sale when the best and worst price does not differ too much or the closest or furthest dealers are both located in about the same rang of distance. The final model(s) can be chosen by maximizing the percentage of concordance in the logistic regression so that the resulting estimate probability of sale can be the most consistent with the actual observed sales actions given the dealers displayed historically.

Various types of cross validations may be applied to the DSA model. For example, the final dataset can be randomly split into two groups for A-B testing and also separated into two parts according to two time windows.

Embodiments of the DSA disclosed herein can also be applied to the dealer side by ranking the customers according to the probability of buying a vehicle from the dealer. In certain embodiments, all the dealer features can be fixed and the probability of sale can be based on the customer's features such as: their household income, gender, and car make choice, distance to the dealer, customer loyalty, customer local dealer density and so on. Demographic information such as average income, average household size, and historical dealer preference for the population from the same ZIP code would be a good estimation input for each unique cohort. The probability of sale of a trim t to a certain customer c among a group of interested customer U can be calculated by the following function:

$$P_b = P_{c,t} = \frac{1}{1 + e^{-\delta_{c,t}}}$$

Examples of potential variables are as follow:

$\delta_{c,t} = \alpha_0$

{Features of Individual Customer, c}
$\alpha_1$×the household income of customer c
$\alpha_2$×the family size of customer c
$\alpha_3$×customer c's household size
$\alpha_4$×customer's local dealer density
$\alpha_5$×if the customer will trade in an old car
$\alpha_6$×the payment type of the customer c (e.g. cash or finance)
{Features Describing the Interaction of Customer c and Dealer}
$\alpha_7$×distance from customer c to the dealer
$\alpha_8$×if customer c bought from the dealer before
$\alpha_9$×dealer's number of sales in customer c's ZIP code
$\alpha_{10}$×if customer c is in the same state as the dealer
+$\varepsilon_{c,t,i}$ Once the customers are ranked by the probability of buying from the dealer, the sales person can better allocated their effect and time by reaching those customers with a higher chance of buying first. More advertising and marketing effort should target at those population and areas with a high probability of buying.

Figure 6:
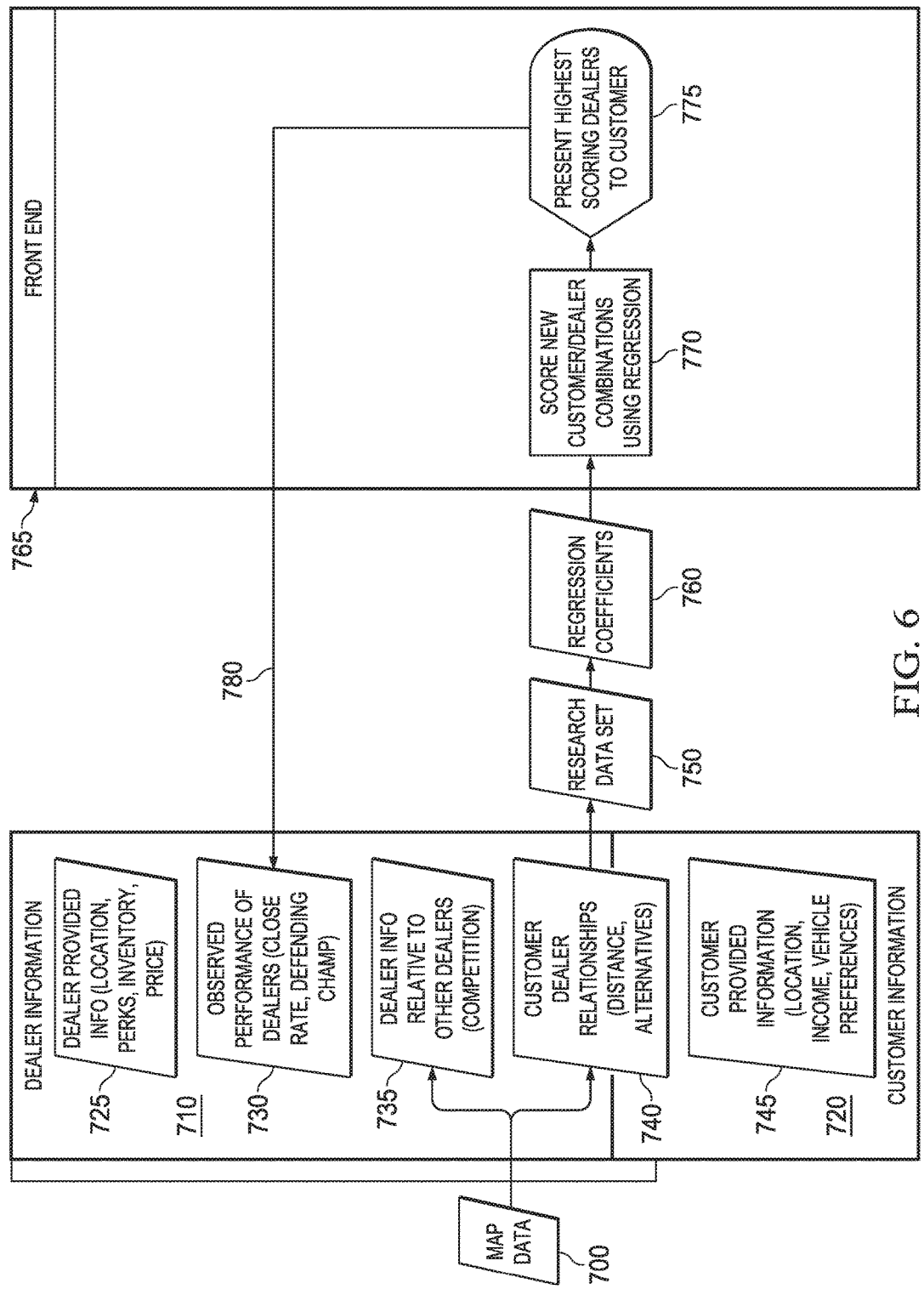
FIG. 6 depicts an example embodiment of a method of using a dealer scoring model.

FIG. 6 depicts an example of using a DSA model. Map data 700 may be a data mapping between dealer information 710 and customer information 720 created from a plurality of sources, such as information associated with dealers 710 and information associated with potential customers 720.

Dealer information 710 may include information that was provided by a dealer 725, observed performance of dealers 730, and dealer information relative to other dealers 735. Dealer provided information 725 may be included information such as a location, perks, inventory, and pricing of products sold by each respective dealer in a set of dealers. This information may be provided by and/or communicated from each of the individual dealers. However, if a dealer is not in a network or does not otherwise provide dealer information 725, then dealer information 725 may be gathered or obtained via a web search, from manufacturer data, or any other source.

Observed performance of dealers 730 may be associated with performance of an individual dealer such as a dealer's close rate. Initially, observed performance of dealers 730 may be set as a research data set or module, such as the DSA model as discussed above. As more data is gathered or collected and communicated via feedback loop 780, this information may be used to update and/or modify observed performance of dealers 730. More specifically, the research data set may be a set of coefficients and variables initially based on empirical data, and based on further interactions with potential customers and dealers the coefficients and variables may be adjusted, updated and/or modified. Accordingly, as more data such as dealer information 710 and/or customer information 720 is accumulated, an updated DSA model may be determined, which may adjust the observed performance of dealers 730.

Dealer information 710 may also include dealer information relative to other dealers (competition) 735. This information may be based in part on dealer provided information 725 associated with dealers that are stored in a database or online third party map services. This data may be normalized data of one dealer within a geographic region against other dealers within the geographic region. For example, if a first dealer has a price for a specific product, an incremental relationship may be determined comparing the price of the specific product at the first dealer to a price of the specific product at other dealers within the geographic region. Similarly, dealer information relative to other dealers 725 may include a normalized drive time to each dealer within a geographic region. The geographic region may be either a radial distance from the potential customer, a geographic region associated with a drive time from a potential customer, and/or a geographic region including a threshold number of potential dealers. For example, the geographic region may include a threshold number of dealers within a drive time distance from the potential customer. An example range of such a threshold number may be from 6 to 10. In an embodiment, dealer information relative to other dealers may be updated dynamically, on a daily, weekly, and/or monthly basis.

Customer information 720 may be information associated with potential customers. For example, customer information 720 may include information pertaining to customer dealer relationships 740, such a drive time from a potential customer to a specific dealer or a number of alternative dealers within a geographic region associated with a location of the potential customer.

Customer information 720 may also include information customer provided information 745, such as a location of the potential customer, an income of the potential customer, and vehicle preferences that may include make/model/trim of the potential customer. In an embodiment, customer information 720 may be obtained by a potential customer directly entering data in a web form on a website. In another embodiment, customer information 720 may be obtained via a partnership organization such as Yahoo® or AAA®, which may have previously obtained and mapped customer information 720 such as age, gender, income and location from a potential customer. In another embodiment, customer information 720 may be obtained via a third party. In this embodiment, any information obtained from a customer such as demographic information, contact information and the like may be transmitted to the third party. The third party may then map or compare the transmitted customer information 720 against their database and communicate any additional customer information 720.

Research data set 750 may include a researched data set based on statistical methodology associated with dealer information 710 and customer information 720. Regression coefficients 750 may then be set based on the statistical methodology to determine research data set 750 and a logistic regression approach. More so, regression coefficients 750 may be set at a moment in time, however as dealer information 710 and customer information 720 are updated, modified or changed research data set 750 and regression coefficients 760 may correspondingly be modified.

Front end 765 represents a front end use of a DSA model associated with a specific potential customer. Using the determined regression coefficients 750, the DSA model may determine scores for customer/dealer combinations 770 for each dealer within a set. Then, in the front end 765, the highest scoring dealers 775 may be presented to the customer 775. Furthermore, information associated with regression coefficients 760 may then be communicated on feedback loop 780 to update and/or modify the observed performance of dealers 730.

Figure 7:
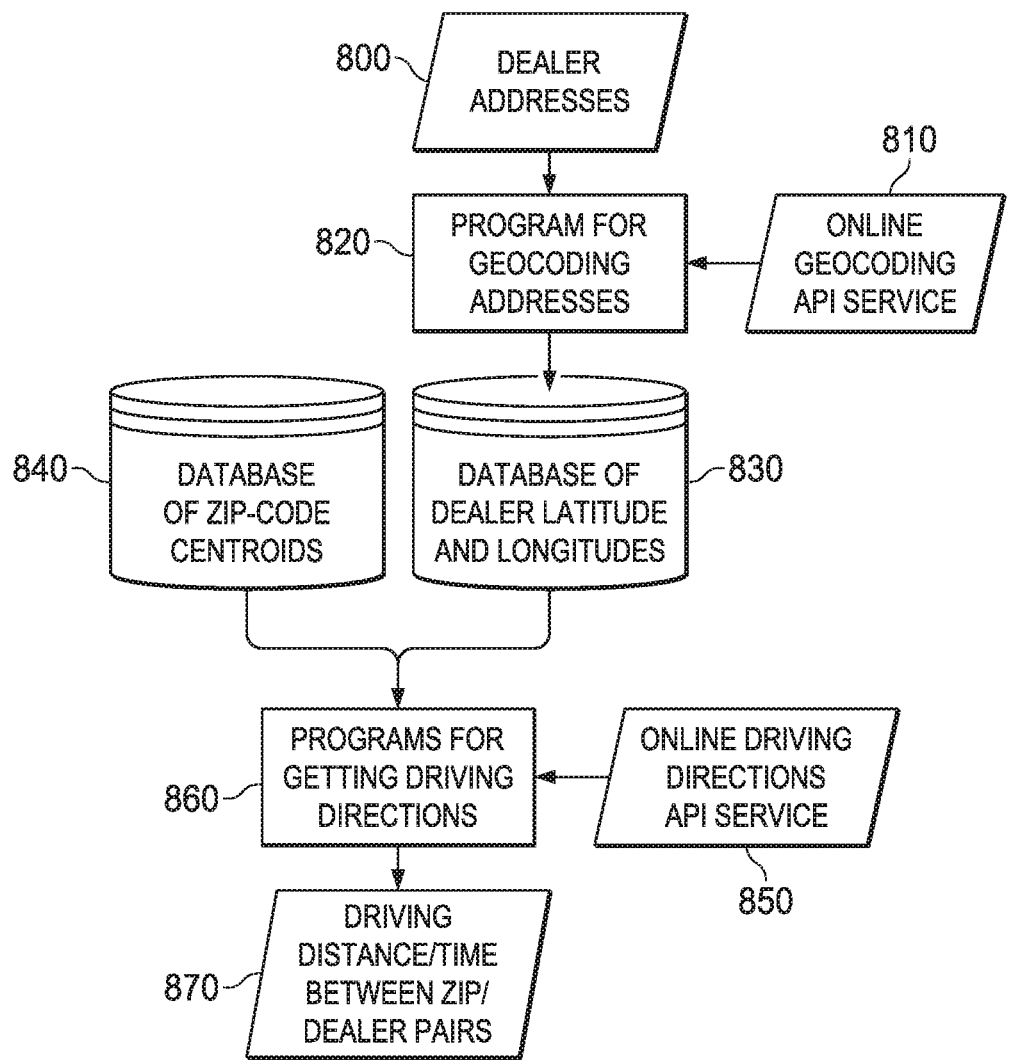
FIG. 7 depicts an example for determining a drive time distance for a dealer within a network.

FIG. 7 depicts an example for determining a drive time distance for a dealer within a network. A dealer may supply the network with the address of the dealer 820. Utilizing an online geocoding API service 810, the geocoded address for the dealer 820 may be determined. The geocoded address of the dealer 820 including the dealer's latitude may then be stored in a database 830. More so, database 830 may include each dealer's within the network geocoded address. A database may include zip-codes centroids 840 associated with zip codes surrounding the dealer. Using an online directions API service 850 and the zip-code center centroids 840, driving directions from the zip-code centroids 840 from the geocoded address of the deal stored in database 830 may be determined. Further, the number driving directions to unique zip-code centroids from the geocoded address of the dealer may be based on empirical evidence associated with the geographic location of the dealer. For example, in one embodiment, driving directions 860 from a dealer may be determined for 6-10 zip-code centroids. Utilizing the driving directions 860, a drive distance/time between the zip-code centroid/dealer pairs 870 may be determined. In further embodiments, this procedure may be repeated each time a new dealer is added to the network.

Although the invention has been described with respect to specific embodiments herein, these embodiments are merely illustrative, and not restrictive of the disclosure. The description herein of representative embodiments of the invention, including the description in the Abstract and Summary, is not intended to be exhaustive or to limit the disclosure to the precise forms described herein (and in particular, the inclusion of any particular embodiment, feature or function within the Abstract or Summary is not intended to limit the scope of the disclosure to such embodiment, feature or function). Rather, the description is intended to describe illustrative embodiments, features and functions in order to provide a person of ordinary skill in the art context to understand the disclosure without limiting the disclosure to any particularly embodiment, feature or function, including any such embodiment feature or function described in the Abstract or Summary. While specific embodiments of, and examples for, are described herein for illustrative purposes, various substantially equivalent modifications are possible within the spirit and scope of the disclosure, as those skilled in the relevant art will recognize and appreciate. As indicated, such modifications may be made to the disclosure in view of the foregoing description of representative embodiments and are to be included within the spirit and scope of the disclosure. Thus, while various representative embodiments have been described herein, a latitude of modification, various changes and substitutions are intended for inclusion in the disclosure, and it will be appreciated that in some instances some features of various representative embodiments may be employed without corresponding use of other features without departing from the scope and spirit of the disclosure as set forth herein. Therefore, many modifications may be made to adapt a particular situation or material to the essential scope and spirit of the disclosure.

Reference throughout this specification to "one embodiment", "an embodiment", or "a specific embodiment" or contextual variants thereof, means that a particular feature, structure, or characteristic described in connection with the subject embodiment is included in at least one embodiment and may not necessarily be present in all embodiments. Accordingly, respective appearances of the phrases "in one embodiment", "in an embodiment", or "in a specific embodiment" or contextual variants thereof, in various places throughout this specification, are not necessarily referring to the same or even related embodiments. Furthermore, the particular features, structures, or characteristics of any particular embodiment may be combined in any suitable manner with one or more other embodiments. It will be understood that other variations and modifications of the representative embodiments described and illustrated herein are possible in light of the teachings herein and are to be considered as part of the spirit and scope of the disclosure.

In the description herein, numerous specific details are provided, such as examples of components and/or methods, to provide a thorough understanding of various representative embodiments. One skilled in the relevant art will recognize, however, that a particular embodiment may be able to be practiced without one or more of the specific details recited, or with other apparatuses, systems, assemblies, methods, components, materials, parts, and/or the like. In other instances, well-known structures, components, systems, materials, or operations are not specifically shown or described in detail to avoid unnecessarily obscuring aspects of embodiments of the invention. While the invention may be illustrated with respect to a particular embodiment, this is not and does not limit the invention to any specific embodiment, and a person of ordinary skill in the art will recognize that additional embodiments are readily understandable and contemplated and included in this disclosure.

Representative embodiments discussed herein may be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices may include a keyboard, monitor, printer, electronic pointing device (for example, mouse, trackball, stylus, touch pad, etc.), and/or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor, whether now known or hereafter derived in the art. For example, a computer-readable medium may refer to a data cartridge, a data backup magnetic tape, a floppy diskette, a flash memory drive, an optical data storage drive, a CD-ROM, ROM, RAM, HD, and/or the like. The processes described herein may be implemented in suitable computer-executable instructions that may reside on a computer readable medium (for example, a disk, CD-ROM, a memory, etc.). Alternatively, conjunctively or sequentially, computer-executable instructions may be stored as software code components on a direct access storage device array, magnetic tape, floppy diskette, optical storage device, and/or other appropriate computer-readable medium or storage device.

Any suitable programming language may be used, individually or in conjunction with another programming language, to implement the routines, methods or programs of various representative embodiments described herein, including C, C++, Java, JavaScript, HTML, or any other programming or scripting language, etc. Other software/hardware/network architectures may be used. For example, the functions of variously disclosed embodiments may be implemented on one computer or shared/distributed among two or more computers in or across a network. Communications between computers implementing representative embodiments can be accomplished using any electronic, optical, radio frequency signals, or other suitable methods and/or tools of communication in compliance with known network protocols.

Different programming techniques may be employed such as procedural or object oriented. Any particular routine can execute on a single computer processing device or multiple computer processing devices, a single computer processor or multiple computer processors. Data may be stored in a single storage medium or distributed through multiple storage media, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative or conjunctive embodiments may be performed at substantially the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein may be implemented in the form of control logic in software or hardware or a combination of both. Control logic may be stored in an information storage medium, such as a computer-readable medium, as a plurality of instructions adapted to direct an information-processing device to perform a set of steps disclosed in the various embodiments. Based on the disclosure and teachings provided herein, a person of ordinary skill in the art will appreciate other ways and/or methods to implement various embodiments disclosed herein.

It is also within the spirit and scope of the invention to implement, in software programming or code, any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented using software programming or code in one or more digital computers, by using application specific integrated circuits, programmable logic devices, field programmable gate arrays; optical, chemical, biological, quantum or nano-engineered systems, components and mechanisms may be alternatively, conjunctively or sequentially used. In general, various functions of disclosed representative embodiments can be achieved by any means now known or hereafter derived in the art; for example, distributed or networked systems, components and circuits may be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example, but not limited to, an electronic, magnetic, optical, electromagnetic, infrared, or semiconductor system, apparatus, system, device, propagation medium, or computer memory. Such computer-readable media are machine-readable and include software programming or code that can be human readable (e.g., source code) or machine readable (e.g., object code). Examples of non-transitory computer-readable media may include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art will appreciate, a computer program product implementing various embodiments disclosed herein may comprise one or more non-transitory computer readable media storing computer instructions translatable by one or more processors in a computing environment.

A "processor" includes any hardware system, mechanism or component that processes data, signals or other information. A processor may include a system with a central processing unit, an application-specific processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing may be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other contextual variant thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

What is claimed is:

1. A vehicle data system comprising:
a processor;
a non-transitory computer readable medium comprising computer code for processing distributed vehicle data, the computer code comprising code for:
in a back-end process:
obtaining a set of historical transaction records from a first set of distributed sources, each transaction record associated with a corresponding vehicle identification number (VIN) and a dealer;
enhancing the historical transaction records with additional vehicle data collected from a second set of distributed sources by VIN;
binning the historical transaction records based on at least one vehicle attribute and geography;
generating a set of likelihood rules based on multivariable regression analysis of a set of vehicle attributes in the enhanced historical transaction records, the likelihood rules defining cumulative price distribution as a function of one or more vehicle attributes in the set of vehicle attributes;
in a front-end process:
providing a web page to a client computer, the web page having one or more input fields for a user to provide a user-specified vehicle configuration comprising a set of user-specified vehicle attributes;
receiving over a network via the web page the set of user-specified vehicle attributes;
generating a responsive web page in response to the user submitting the user-specified vehicle attributes comprising:
applying dealer selection rules to select a set of dealers;
determining values for the one or more vehicle attributes from the set of enhanced historical transaction records associated with the selected set of dealers;
applying the likelihood model to the values for the one or more vehicle attributes determined from the set of enhanced historical transaction records associated with the selected set of dealers to generate a cumulative distribution of prices associated with the set of enhanced historical transaction records associated with the selected set of dealers;

fitting a curve to the cumulative distribution generated from the set of enhanced historical transaction records corresponding to the selected set of dealers;

generating HTML to cause a browser at the client computer to display the curve about an average price for the user-selected configuration and relative price ranges;

sending the HTML to the client computer.

2. The vehicle data system of claim 1, wherein a user locale is received over a network via the web page in association with the set of user-specified vehicle attributes and the selection of the set of dealers using the dealer selection rules is based on the user's locale.

3. The vehicle data system of claim 2, wherein the set of dealers is the set of dealers closest to the user's locale.

4. The vehicle data system of claim 3, wherein selecting the set of dealers comprises scoring the dealers based on a set of dealer scoring rules.

5. The vehicle data system of claim 1, wherein the set of vehicle attributes include vehicle supply, vehicle demand, and the number of days that the vehicle has been on a selected dealer's lot.

6. The vehicle data system of claim 5, wherein vehicle supply is associated with a number of vehicles currently in an inventory of the selected set of dealers.

7. The vehicle data system of claim 1, comprising code for applying a set of cleansing rules to the set of historical transaction data to replace vehicle data of one or more historical transaction records.

8. The vehicle data system of claim 4, comprising code for generating an average price paid for the user-specified vehicle configuration.

9. The vehicle data system of claim 8, wherein the HTML is generated to cause a browser at the client computer to display the curve with the average price paid visually represented relative to the curve.

10. The vehicle data system of claim 9, comprising code for generating one or more relative price ranges for the user-specified vehicle configuration.

11. The vehicle data system of claim 10, wherein the HTML is generated to cause a browser at the client computer to display the curve with the one or more relative price ranges visually represented relative to the curve.

12. A vehicle data system comprising:
a processor;
a non-transitory computer readable medium comprising computer code for processing distributed vehicle data, the computer code comprising code for:
obtaining a set of historical transaction records from a first set of distributed sources;
binning the historical transaction records based on at least one vehicle attribute and geography;
generating a set of likelihood rules based on multivariable regression analysis of a set of vehicle attributes in the enhanced historical transaction records, the likelihood rule defining cumulative price distribution as a function of one or more vehicle attributes in the set of vehicle attributes;
providing a web page to a client computer, the web page having one or more input fields for a user to provide a user-specified vehicle configuration comprising a set of user-specified vehicle attributes and a user locale;
receiving over a network via the web page the set of user-specified vehicle attributes and the user locale;
generating a responsive web page in response to the user submitting the user-specified vehicle attributes and the user locale, generating the responsive web page comprising: generating HTML to cause a browser at the client computer to display a curve about an average price for the user-selected configuration and relative price ranges, the curve based on applying dealer selection rules to select a set of dealers using the user locale, determining values for the one or more vehicle attributes from the set of enhanced historical transaction records associated with the selected set of dealers, applying the likelihood model to the values for the one or more vehicle attributes determined from the set of enhanced historical transaction records associated with the selected set of dealers to generate a cumulative distribution of prices associated with the set of enhanced historical transaction records associated with the selected set of dealers, and fitting the curve to the cumulative distribution.

13. The vehicle data system of claim 12, wherein the set of dealers is the set of dealers closest to the user's locale.

14. The vehicle data system of claim 13, wherein selecting the set of dealers comprises scoring the dealers based on a set of dealer scoring rules.

15. The vehicle data system of claim 12, wherein the set of vehicle attributes include vehicle supply, vehicle demand, and the number of days that the vehicle has been on a selected dealer's lot.

16. The vehicle data system of claim 15, wherein vehicle supply is associated with a number of vehicles currently in an inventory of the selected set of dealers.

17. The vehicle data system of claim 12, comprising code for applying a set of cleansing rules to the set of historical transaction data to replace vehicle data of one or more historical transaction records.

18. The vehicle data system of claim 14, comprising code for generating an average price paid and one or more relative price ranges for the user-specified vehicle configuration.

19. The vehicle data system of claim 18, wherein the HTML is generated to cause a browser at the client computer to display the curve with the average price paid and the one or more relative price ranges visually represented relative to the curve.

* * * * *